United States Patent [19]
Lee et al.

[11] Patent Number: 5,872,650
[45] Date of Patent: Feb. 16, 1999

[54] OPTICAL AMPLIFIERS

[75] Inventors: Yong-Woo Lee, Yongin, Rep. of Korea; Lars Johan Albinsson Nilsson, Karlskoga, Sweden; Sung-Jun Kim, Pyeongtaek, Rep. of Korea

[73] Assignee: SamSung Electronics Co., Ltd., Suwon, Rep. of Korea

[21] Appl. No.: 798,213

[22] Filed: Feb. 10, 1997

[30] Foreign Application Priority Data

Feb. 10, 1996 [KR] Rep. of Korea ................ 96-3244

[51] Int. Cl.$^6$ ........................................ H01S 03/00
[52] U.S. Cl. ........................................ 359/341
[58] Field of Search ................ 359/341; 372/6; 354/344

[56] References Cited

U.S. PATENT DOCUMENTS

| | | | |
|---|---|---|---|
| 5,050,949 | 9/1991 | DiGiovanni et al. | 359/341 |
| 5,111,334 | 5/1992 | Heidemann . | |
| 5,128,801 | 7/1992 | Jansen et al. . | |
| 5,155,621 | 10/1992 | Takeda et al. . | |
| 5,177,634 | 1/1993 | Way | 359/341 |
| 5,184,247 | 2/1993 | Schimpe . | |
| 5,280,383 | 1/1994 | Federici et al. | 359/341 |
| 5,345,332 | 9/1994 | DaSilva et al. . | |
| 5,406,404 | 4/1995 | DiGiovanni et al. | 359/161 |
| 5,430,572 | 7/1995 | DiGiovanni et al. | 359/341 |
| 5,530,584 | 6/1996 | Myslinski et al. | 359/341 |
| 5,546,222 | 8/1996 | Plaessmann et al. . | |
| 5,572,358 | 11/1996 | Gabl et al. . | |

FOREIGN PATENT DOCUMENTS

| | | |
|---|---|---|
| 0695002A2 | 1/1996 | European Pat. Off. . |
| 2281669 | 8/1995 | United Kingdom . |

Primary Examiner—Mark Hellner
Attorney, Agent, or Firm—Robert E. Bushnell, Esq.

[57] ABSTRACT

A multiwavelength, multistage optical amplifier, which can be arranged in a cascade, substantially increases the degree of automatic power control (APC), multiwavelength APC (MAPC), and multiwavelength automatic gain control (MAGC), for at least two wavelengths. The multiwavelength, multistage optical amplifier or amplifier cascade has at least two spectrally different gain media (GM), i.e. first and second GM, connected in series for amplifying a signal having at least two wavelengths, i.e. first and second wavelengths. The first GM may be aluminosilicate erbium doped fiber, the second GM may be germanosilicate erbium doped optical fiber. The gain at the first wavelength is smaller than the gain at the second wavelength, while the signal power at the first wavelength is larger than the signal power at the second one, and vice versa. This may automatically compensate for loss tilt. The gain media may be homogeneously broadened.

16 Claims, 30 Drawing Sheets

OPTICAL AMPLIFIERS

CLAIM OF PRIORITY

This application makes reference to, incorporates the same herein, and claims all benefits accruing under 35 U.S.C. §119 from an application entitled Optical Amplifiers earlier filed in the Korean Industrial Property Office on 10 Feb. 1996, and there duly assigned Ser. No. 3244/1996 by that Office.

BACKGROUND OF INVENTION

Field of Invention

The present invention relates to optical amplifiers. More particularly, the present invention relates to multiwavelength optical amplifiers.

Discussion of Related Arts

Optical amplifiers (OAs) are already widely employed and is expected to be even more widely employed in future telecommunications systems. Among optical amplifiers, erbium doped fiber amplifiers (EDFAs) are becoming particularly popular. They serve to periodically amplify an optical signal being transferred over great distances in optical fibers, such as in complex networks, without regeneration, and to compensate for attenuation of the optical signal caused by the long-distance transmission. Exemplars of the contemporary practice include Gabl et al. (U.S. Pat. No. 5,572,358, Regenerative Amplifier Incorporating A Spectral Filter Within The Resonant Cavity, Nov. 5, 1996) discussing a regenerative amplifier that includes a resonant cavity having a gain medium. A spectral filter is located in this resonant cavity. To this, a source is provided to pump the gain medium and thereby raise it to an excited state. Plaessmann et al. (U.S. Pat. No. 5,546,222, Multi-Pass Amplifier, Aug. 13, 1996) discusses a multiple-pass laser amplifier that uses an optical focusing between subsequent passes through a single gain medium so that a reproducibly stable beam size is achieved within the gain region. Schimpe (U.S. Pat. No. 5,184,247, Optically Stabilized Feedback Amplifier, Feb. 2, 1993) discusses an arrangement for operation as an optical feedback amplifier which is composed of a DFB laser. The grating of the DFB laser selects a wavelength that differs from the wavelength at which the amplification medium has a maximum gain. Way (U.S. Pat. No. 5,177,634, High Gain Limiting Erbium-Doped Fiber Amplifier With Wide-Dynamic Range, Jan. 5, 1993) discusses an optical limiting amplifier having a high gain over a wide dynamic range of input power levels. The amplifier has an input stage and an output stage, each of which includes an erbium-doped fiber amplifier. Takeda et al. (U.S. Pat. No. 5,155,621, Optical Fiber Amplifier, Oct. 13, 1992) discusses an optical fiber amplifier in which light, generated within an erbium doped optical fiber by spontaneous emission, is eliminated or suppressed. Jansen et al. (U.S. Pat. No. 5,128,801, Integrated Optical Signal Amplifier, Jul. 7, 1992) discusses an optical signal amplifier with a waveguide path integrated into a glass body that is doped with an optically active material. The signal to be amplified is transmitted through the waveguide. The pump power is coupled into the waveguide at one of the ends.

In many optically amplified systems, unfortunately, it is very unlikely that the gain and attenuation will match each other at several wavelengths simultaneously for the majority of operating conditions. In contrast, for single wavelength systems, this occurs automatically at some wavelength so long as the loss does not exceed the gain available from the OAs. This can be especially notable because the attenuation between amplifiers conceivably changes with different wavelength dependencies, for different reasons. Examples of the reasons can be splice degradation, incorporation of power splitters or other optical elements into the transmission path, incorporation of dispersion compensating fibers, and increased micro-bending losses. With such an uncertainty in prediction of signal powers due to the dependence of the loss of the signal powers on the wavelengths, it is impossible to ensure a flat gain as the inter-amplifier loss changes, with homogeneously broadened amplifiers like the EDFA. From my study of the contemporary practice and of the art, I find that there is a need for an improved optical amplifier that enables an effective power and gain control.

SUMMARY OF INVENTION

To circumvent the above problems and to improve the art, it is an object of present invention to provide a multiwavelength, multistage optical amplifier for enabling an multiwavelength power control or an multiwavelength automatic gain control (MAPC/MAGC) using different types of gain media in a system incurring large losses, such as a system for long-distance transmission.

It is another object to provide an optical amplifier cascade in which optical amplifiers for multiwavelength optical signal transmission are connected in series, thereby enabling MAPC/MAGC in the cascade as a whole.

It is still another object to provide a multiwavelength optical amplifier cascade for automatic loss tilt compensation (ALTC) within a predetermined wavelength range, in contrast to the conventional amplified WDM system.

According to one aspect of the present invention, there is provided an optical amplifier system including a plurality of gain media connected in series and arranged to amplify a signal having a plurality of wavelengths. At least some of said gain media work in saturation. Different ones of the gain media are spectrally different such that they interact primarily with different ones of the wavelengths, so that in the event of a perturbation of signal powers from an equilibrium distribution between the wavelengths, the optical amplifier system acts to return the signal powers towards the equilibrium distribution.

An optical amplifier system of the present invention may include a single optical amplifier in which the plurality of gain media are connected in series.

Such an optical amplifier system as above may include a plurality of optical amplifiers connected in series, each optical amplifier having at least one of the gain media.

Preferably, one of the gain media includes an erbium doped fiber. One of the gain media may include aluminosilicate erbium doped fiber. The erbium doped fiber need not be absolutely pure aluminosilicate type, because a small amount of germanium in the aluminosilicate fibre may not affect the spectrum significantly.

One of the gain media may include germanosilicate erbium doped fiber. The erbium doped fiber need not be absolutely pure germanosilicate type, because a small amount of aluminum in the germanosilicate fibre may not affect the spectrum significantly.

One of the gain media may include a phosphosilicate or alumino-phosphosilicate erbium doped fiber.

For one of the gain media, the gain swing at a first wavelength may be larger than the gain swing at a second wavelength, while the opposite is true in another of the gain media.

Preferably, first and second ones of the gain media are connected alternatelyin series. Such an optical amplifier system may be arranged for multi-wavelength transmission in a wavelength range, wherein first and second ones of the gain media interact primarily with wavelengths at opposite respective ends of the wavelength range. Preferably, the gain media are homogeneously broadened.

An optical amplifier system as above may include Optical Limiting Amplifiers (OLAs) to enhance signal-power induced gain compression. The optical amplifier system may include filters to provide different gain characteristics in different gain media, such that the respective loss associated with each of those gain media is large at wavelengths where the respective gain swing is small. Preferably, the spectral dependence of the gain swings in different ones of the gain media substantially cancel each other at predetermined wavelengths or ranges of wavelengths.

One of the gain media may be a germanosilicate erbium doped fiber with little or no aluminum content such that the gain swing $g_{p-p}$ increases with wavelength in the range 1543 to 1549 nm, and the gain swing of at least one other of the gain media decreases in the same range. Such an optical amplifier system may be adapted to transmit wavelengths in the range 1540 to 1552 nm. The other of the gain media may be selected from the group comprising high aluminum content alumino-gernanosilicate erbium doped fiber, phosphorous doped silicate erbium doped fiber and phosphate erbium doped fiber.

BRIEF DESCRIPTION OF THE DRAWINGS

For a better understanding of the invention, and to show how embodiments of the same may be carried into effect, reference will now be made, by way of example, to the accompanying diagrammatic drawings, in which.

DETAILED DESCRIPTION OF THE PREFERRED EMBODIMENTS

Figure 1:
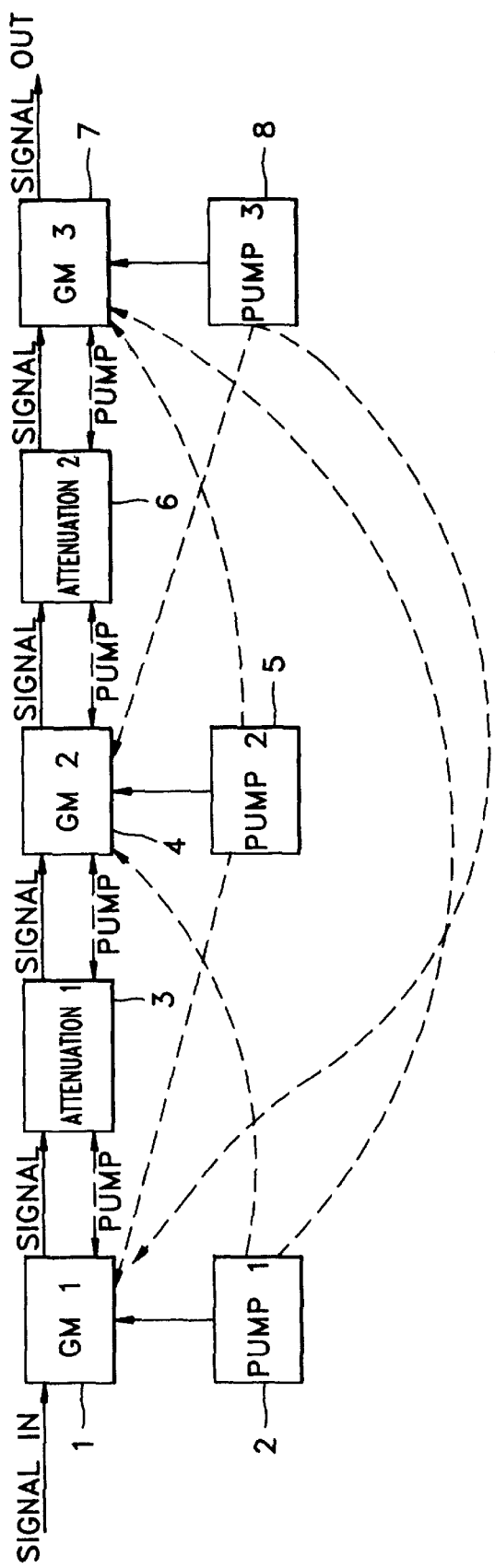
FIG. 1 illustrates a block diagram of an optical amplifier or system with many gain media.

An optical transmission link, an optical transmission network, an optical amplifier, and a multiwavelength laser, for achieving MAPC/MAGC by using different types of gain media according to examples of the present invention will be described.

Some new problems (e.g. dispersion) arise with the high data rates and/or long distances that are typical for periodically amplified transmission links. Wavelength division multiplexing (WDM) represents a method of overcoming some of these problems. In WDM, a typically high data rate is transmitted over several optical carriers, each with a different optical wavelength, and thus transmission speed and capacity are increased.

In the following several paragraphs, we will assume that one optical carrier represent one channel, in order to keep the description concise. Optical powers representing the strength of signals can evolve differently in different channels. These power differences can be seriously large in optically amplified systems, if the signals are attenuated and re-amplified repeatedly, or if they travel through different paths in an optical network.

The power differences can stem from the following reasons.

(1) The gain can be different in different channels. A further difficulty arises in that if the gain level of a homogeneously broadened OA like an EDFA changes, the gain levels at different wavelengths normally change by different amounts. Furthermore, it can be difficult or even impossible to know what level of gain an OA will operate at, especially since the level may vary with time. Still, EDFAs that are gain-flattened or gain-equalized regardless of wavelengths have been demonstrated, including those that are gain-flattened or gain-equalized independently of operating conditions. However, the gain will not be perfectly flat or equal. In systems with many concatenated OAs, even small gain differences between channels can be detrimental to a system, and lead to significant power differences.

(2) The signal attenuation (e.g. loss) between amplifiers can be different in different channels resulting in significant power differences. As for the amplification, the attenuation can also vary with time, and this variation can be different for different wavelengths in an unpredictable way.

It can be concluded that it is very unlikely that the gain and attenuation will match each other at several wavelengths simultaneously for the majority of operating conditions. (In contrast, for single wavelength systems, this occurs automatically at some wavelength so long as the loss does not exceed the gain available from the OAs.) This is especially so since the attenuation between amplifiers conceivably changes with different wavelength dependencies, for different reasons. Examples of the reasons can be splice degradation, incorporation of power splitters or other optical elements into the transmission path, incorporation of dispersion compensating fibers, and increased micro-bending losses. In fact, with such an uncertainty in prediction of signal powers due to the dependence of the loss of the signal powers on the wavelengths, it is impossible to ensure a flat gain as the inter-amplifier loss changes, with homogeneously broadened amplifiers like the EDFA.

Even if the gain and loss would always be balanced for all channels, that is, if the sum of the gain and loss (including a negative sign) would be 0 dB for all channels, this does not ensure that the powers in all channels are equal. Unequal powers can still result for the following reasons.

(1) The signal power input into the system may be different at different wavelengths.

(2) Different signals may travel through different channels in a complex network with routing. When the signals are combined again, their powers will most likely be different from each other, unless some form of power control is employed for each individual signal.

(3) Tunable optical taps may be used, which may attenuate the channels selectively in an unpredictable way.

For many applications, it would be better if the OAs could make the power of the different channels equal (automatic power equalization, APE) rather than make the gain equal. At least, power differences should be kept within certain bounds. This requires that the gain of a channel with a low input power outside the bounds should be higher than it is for channels with powers inside the bounds. Such an effect is referred to as multichannel automatic power control (MAPC). If MAPC is obtained in a periodically amplified transmission system, the gain compensates the loss for each and every channel to obtain appropriate channel powers. This is referred to as multichannel automatic gain control MAGC. Thus, the system receives relative protection against variations in loss between the amplifiers, although the equilibrium signal powers are then likely to change.

It is well-known that MAPC can be achieved in inhomogeneously broadened amplifiers. However, the commercially available EDFA is predominantly homogeneously broadened at room temperature. As a consequence, the gain at one wavelength is to a good approximation uniquely related to the gain at all other wavelengths. Thus, it cannot be said that the gain of a high power channel is smaller than that of a low power channel. In other words, gains depend on the wavelengths of the channels.

In contrast, in an inhomogeneously broadened amplifier, the gain at one wavelength is partially independent of the gain at other wavelengths. In long distance WDM, provided that the gain at other wavelengths is not affected, at least to some extent, the gain at one wavelength is reduced if the power at that wavelength becomes large. This is termed gain compression or gain saturation. On the other hand, if there is a strong signal compressing the gain at another wavelength, the gain can remain high at the first wavelength.

Several methods have been proposed for MAPC or MAGC in an EDFA.

(1) One method relies on the cooling of a gain medium, i.e. an EDF, at very low temperatures. While this method is reported to work quite well, the additional complexity in devices resulting from the cooling is a quite significant drawback.

(2) In another method, a twin-core EDFA is used for spatially separating a path traversed by different wavelengths, thus effectively inhomogeneously broadening a gain medium as a whole, although each and every point in the gain medium is in itself homogeneously broadened. This method also suffers from some drawbacks, such as: the twin-core EDFA is known to generate more noise than that of single cores, an undesired polarization dependence may arise, considerable amounts of power are lost, and fabrication of the twin-core fiber can be difficult.

(3) In yet another method, the multiplexed wavelengths are split up into wavelength-selective couplers (WSC), and amplified in different EDFs. The gains of the different channels can thus be decoupled from each other, which corresponds to an inhomogeneous broadening. Drawbacks of this approach are that the amplifier becomes much more complicated, and a pump power is not used in an efficient way.

To circumvent the above problems, one of the preferred embodiments of the present invention provides a multiwavelength, multistage optical amplifier for enabling MAPC/MAGC using different types of gain media in a system incurring large losses, for example, a system for long-distance transmission.

An optical transmission link, an optical transmission network, an optical amplifier, and a multiwavelength laser, for achieving MAPC/MAGC by using different types of gain media according to examples of the present invention will be described. Turning now to the drawings, FIG. 1 is a schematic view of one example of the present invention. It includes at least two different wavelength-dependent gain media (GM) of at least two different types. The gain media are separately or collectively pumped by optical or other means, and separated from each other by linear or nonlinear attenuating media, e.g. transmission fiber. Furthermore, attenuating elements are optionally inserted inside the gain media.

FIG. 1 is a generic figure. It is possible to consider all of the components as being part of a single optical amplifier. Then, FIG. 1 represents an optical amplifier for MAPC/MAGC. The amplifier may be realized as a single physical unit. In other words, we can take all the components of FIG. 1 and put them into a box which will be an OA for MAPC/MAGC. Alternatively, at least parts of the loss between the gain media may be caused by transmission fiber. In this case, FIG. 1 can represent three optical amplifiers (each of which typically constitutes an individually pumped physical unit) separated by two stretches of transmission fibers. Then, FIG. 1 is actually equivalent to a part of a transmission link or network with an inherent MAGC/MAPC/ALTC capability. Alternatively, if the signal output port of FIG. 1 is connected to its signal input port (with an output coupler and perhaps another attenuating element in between), a ring-type laser cavity is formed, and FIG. 1 represents a multiwavelength laser with MAPC.

For specific or changing operating conditions, an automatic distribution or redistribution of the gain between the different gain media takes place so that the device fulfills MAPC for laser as well as MAPC or ALTC for WDM. Brief requirements for an example of the present invention are as follows.

1. MAPC or ALTC for WDM:

If the configuration of FIG. 1 (or a combination of different configurations) is cascaded (with transmission fiber in between), the resulting transmission link will be able to support transmission at at least two wavelengths simultaneously. Specifically, the transmission in the cascade is, to some extent, immune to changes of the wavelength-independent and wavelength-dependent losses between the amplifiers. Furthermore, it has some power equalization capability.

2. MAPC for laser:

If the OA in FIG. 1 or a combination of different OAs according to FIG. 1 constitute the basis for a laser, the laser is able to emit (lase) at more than one wavelength simultaneously. Specifically, the laser is, to some extent, immune to changes of the wavelength-independent and wavelength-dependent losses in the cavity.

The criteria require that the gain at one wavelength is not uniquely related to the gain at another wavelength. The gain media are assumed to be homogeneously broadened Below follows a description of how the gain can be calculated in homogeneously broadened gain media Based on the description, it will be shown how devices can be constructed so that the total gain can be redistributed between different homogeneously broadened gain media in a way that fulfils the criteria above. For an OA based on a single homogeneously broadened gain medium, the gain G (in dB) at a wavelength $\lambda$ can be written as $$G(n_2,\lambda)=[g^*(\lambda)n_2-\alpha(\lambda)(1-n_2)]L-f(\lambda)=g_{p \to p}(\lambda)n_2 L-\alpha(\lambda)L-f(\lambda). \quad (1)$$

where L is the length of the gain medium, $\alpha(\lambda)$ is the absorption spectrum of the gain medium in decibels per meter, $g^*(\lambda)$ is the gain, in decibels per meter, of the medium at complete inversion, $g_{p \to p}(\lambda) \equiv [g^*(\lambda)+\alpha(\lambda)]$ is the gain swing, in decibels per meter, $n_2$ is the degree of excitation, i.e. the ratio of amplifying (i.e active) centers (e.g. $Er^{3+}$ ions) in the excited, metastable state to the total number of centers, and $f(\lambda)$ is an additional loss caused by, e.g. a filter installed before, after, or inside the OA. In a network, $f(\lambda)$ can also represent transmission losses in an optical fiber before or after the OA, as well as splitting losses and other types of losses. If $n_2$ is properly averaged over the transverse and longitudinal coordinates of a propagating light beam, equation (1) is equivalent to exact but more complex expressions involving explicit transverse and longitudinal integration.

For present purposes, for a given OA, L, $\alpha(\lambda)$, and $g^*(\lambda)$ are intrinsic properties that do not vary in time. Thus, for a given homogeneously broadened OA, the gain at any and all wavelengths is determined by the value of $n_2$, which in turn depends on the input pump and signal power spectra. The gain (spectrum) at a fixed value of $n_2$ is known as the locked inversion (LI) gain (spectrum). Only the ground state and the metastable state of active centers are assumed populated in equation (1). This is a reasonable approximation for many realistic gain media. If other levels can be significantly populated, an extra degree of freedom should be introduced. This extra degree of freedom does not significantly affect the homogeneous character of the gain, and the main results presented here are valid.

While the above description assumes that the losses change and that $\alpha$ and $g^*$ are constant, those skilled in the art will realize that the described example will be immune also to variations in $\alpha$ and $g^*$, as for instance brought about by temperature changes. It is evident from Equations 6 and 7 below that also $\alpha$ and $g^*$ can vary by some amount without either $G_{2,1}$ or $G_{1,2}$ becoming smaller than zero.

In this context, we will assume that $n_2$ is wavelength-independent. This is a good approximation for realistic EDFAs, if the amplifying erbium ions are confined to the core of a single mode fiber. The inhomogeneity that would be introduced by a wavelength-dependent $n_2$ would, like all other inhomogeneities, improve the MAPC. Hence, with a wavelength-independent $n_2$, it follows from equation (1) that for a given value of gain for a signal at one wavelength, only one wavelength-dependent value of the gain is possible at another wavelength. Such gain may be higher or lower than the gain at the first wavelength, and as long as the gain at the first wavelength is fixed, the distribution of power between the channels does not matter. As a consequence, MAPC, MAGC, and ALTC are impossible.

If all OAs in a link or network are made from gain medium with identical spectra $g^*(\lambda)$ and $\alpha(\lambda)$, then equation (1) can be applied to the link or network as a whole as well. Thus, no MAPC, MAGC, or ALTC will be possible in a network for which the amplification takes place in homogeneously broadened gain media of the same type.

From equation (1), it follows that the gain changes with n according to:

$$\partial G(n_2,\lambda)/\partial n_2 = [g^*(\lambda)+\alpha(\lambda)]L = g_{p-p}(\lambda)L \qquad (2)$$

Hence, a change of the (locked inversion) gain $\Delta G_1$ at one wavelength $\lambda_1$ is related to the change of the (LI) gain $\Delta G_2$ at another wavelength $\lambda_2$ according to:

$$\Delta G_1/\Delta G_2 = g_{p-p}(\lambda_1)/g_{p-p}(\lambda_2) \qquad (3)$$

In the case where several different types of homogeneously broadened gain media are used, the overall gain cannot be described by equation (1) or by a single value $n_2$. Instead, it can then be ascribed to each of the k different gain media or types of gain media. The gain can be written as $$G(\lambda, n_{2,1}, n_{2,2}, \ldots, n_{2,i}, \ldots, nk_{2,k}) = \qquad (4)$$
$$\sum_{i=1}^{k} [g_i^*(\lambda)n_{2,i} - \alpha_i(\lambda)(2-n_{2,i})]L_i - f(\lambda)$$

where the symbols have the same meaning as in equation (1), except that a subscript has been added to distinguish the quantities related to different types of gain media. For example, $f(\lambda)$ is the total attenuation for the considered transmission path of possible filters and/or background losses, etc., in decibels. It follows from elementary linear algebra that equation (4) in general allows for arbitrary, independent, values of gain at k different wavelengths (as long as the condition $0<n_{2,i}<1$ is fulfilled for all i $\in[1,k]$. The degree of excitation in a gain medium is determined by the signal and pump powers input into it. In a cascade of OAs, these powers in turn depend upon both on the OAs themselves and the losses between them.

The core of the present example of the invention is to provide a system of OAs to automatically (re-)distribute the gain between different gain media so that the criteria for MAPC and ALTC are fulfilled, without relying on any monitoring of light powers or electronic control of some components.

Figure 2:
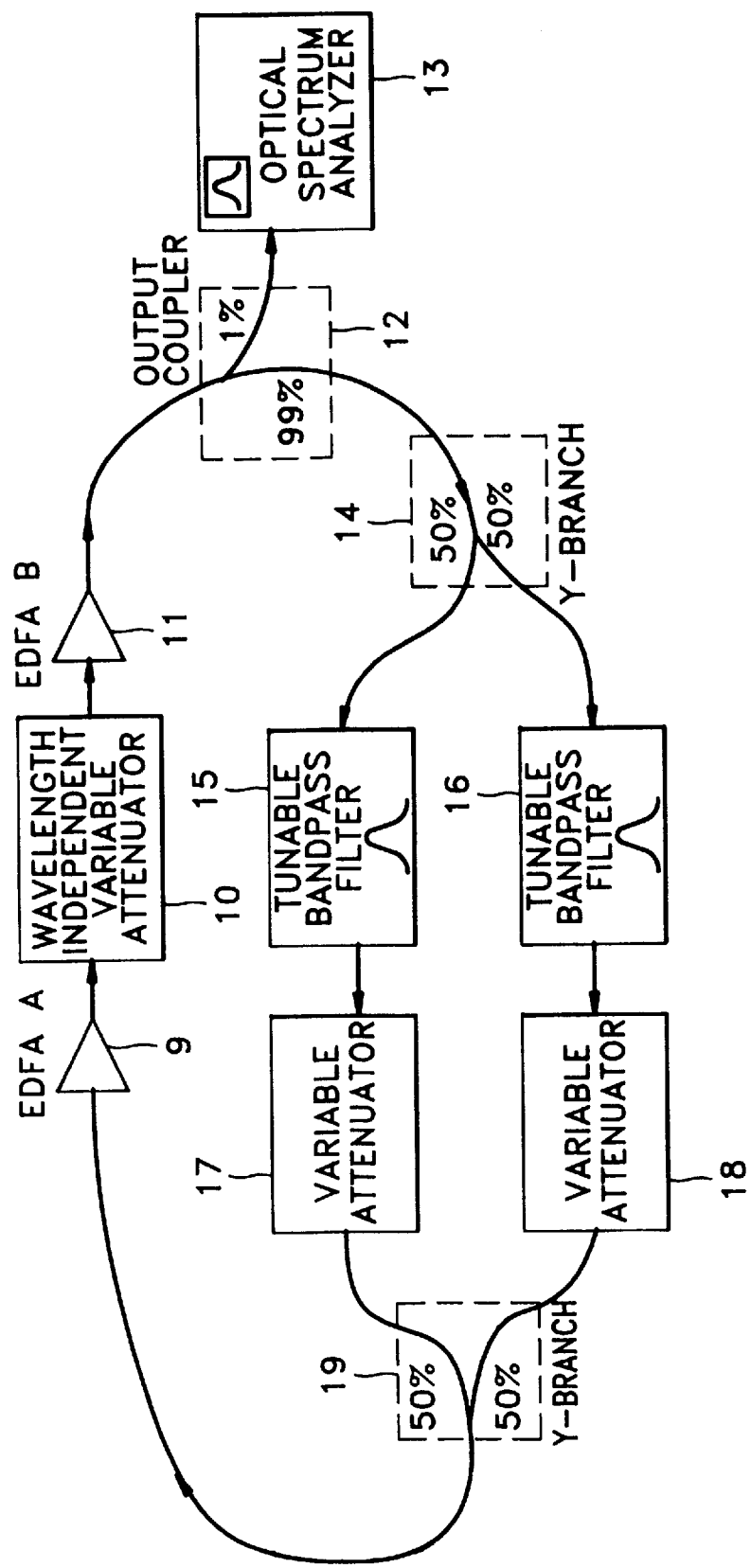
FIG. 2 illustrates a block diagram of an example of a dual wavelength ring laser based on erbium doped fiber amplifiers (EDFAs)
Figure 3:
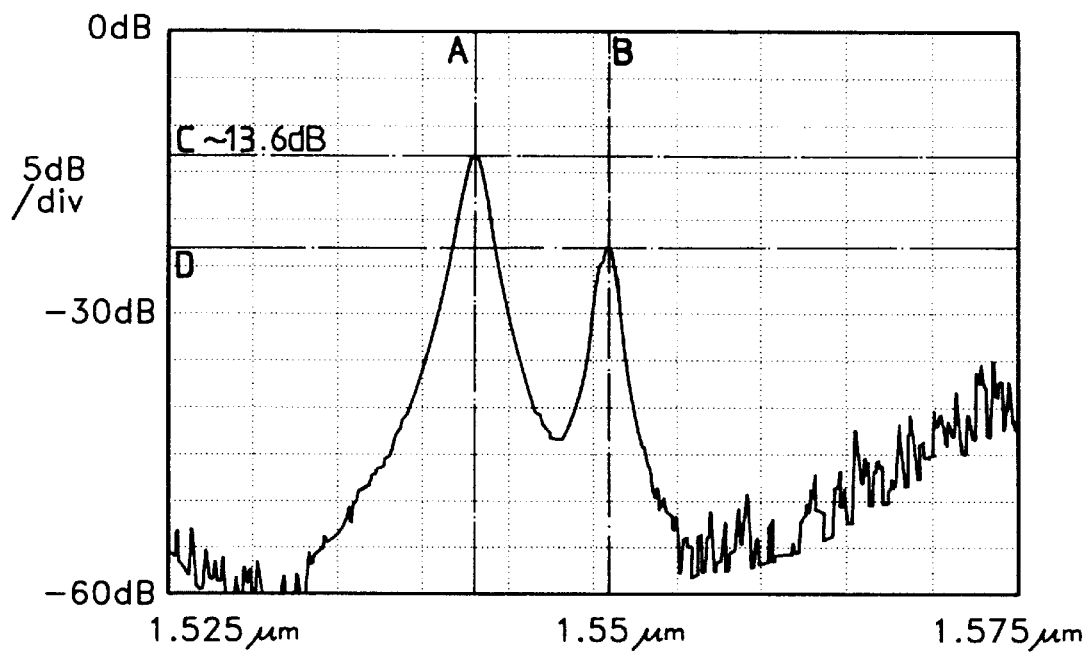
FIG. 3 illustrates a graph of transmission spectrum of a lower filter-attenuator combination from the input of 14 to the output of 19 in the laser of FIG. 2.

Next, such a system will be described. FIG. 2 illustrates a ring laser based on EDFAs. Two tunable bandpass filters 15 and 16 control lasing wavelengths, and by adjusting the attenuators, lasing could be obtained at one, both, or none of the potential wavelengths. FIG. 3 shows the result of the transmission of the lower filter-attenuator combination from a Y-branch 14 to a Y-branch 19 of FIG. 2.

Figure 4:
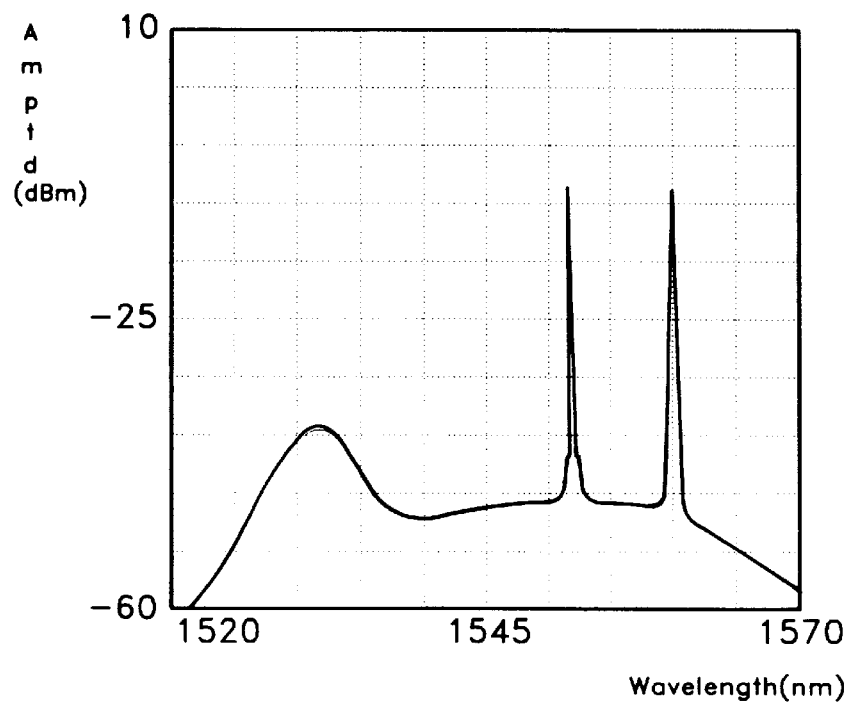
FIG. 4 illustrates a graph of an output spectrum of a dual wavelength ring laser incorporating two EDFAs based on high aluminum-content alumino-germanosilicate erbium-doped fibers (EDFs)
Figure 5:
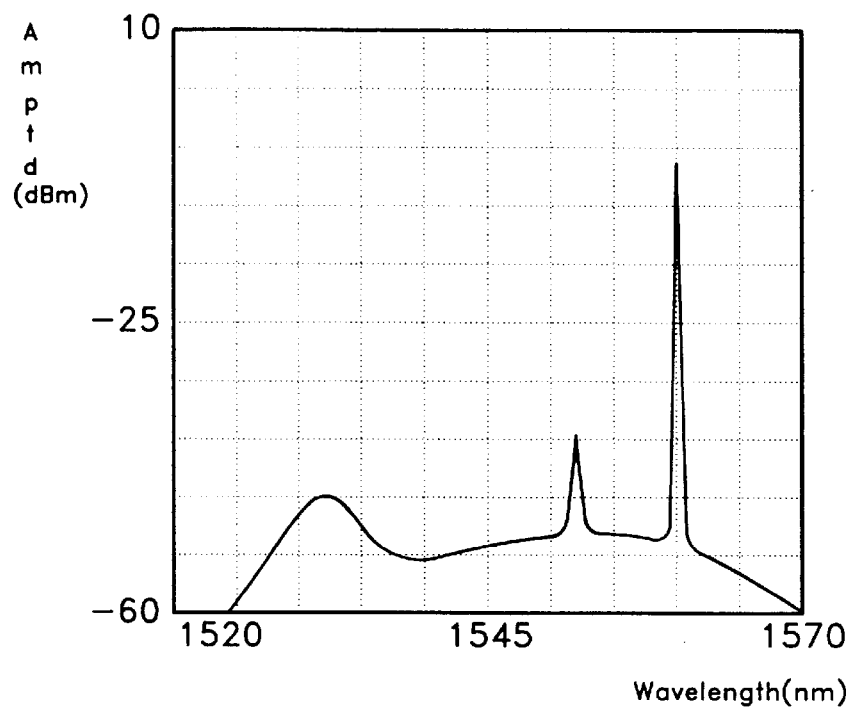
FIG. 5 illustrates a graph of an output spectrum of the dual wavelength ring laser when attenuation is decreased by 3 dB in all attenuators of the device whose output is shown in FIG. 4.
Figure 6:
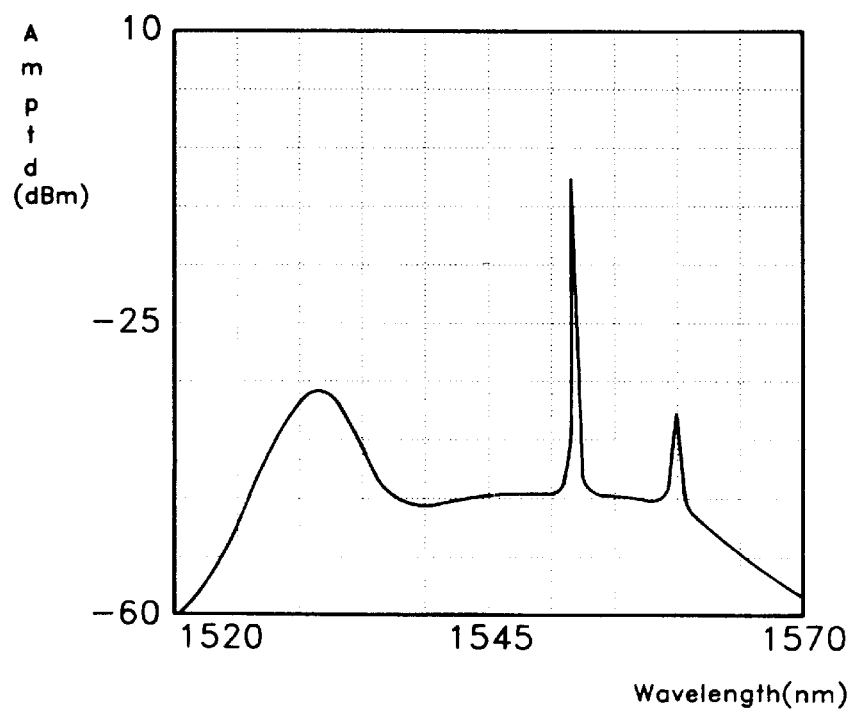
FIG. 6 illustrates a graph of an output spectrum of the dual wavelength ring laser when attenuation is increased by 2 dB in all attenuators of the device whose output is shown in FIG. 4.
Figure 7:
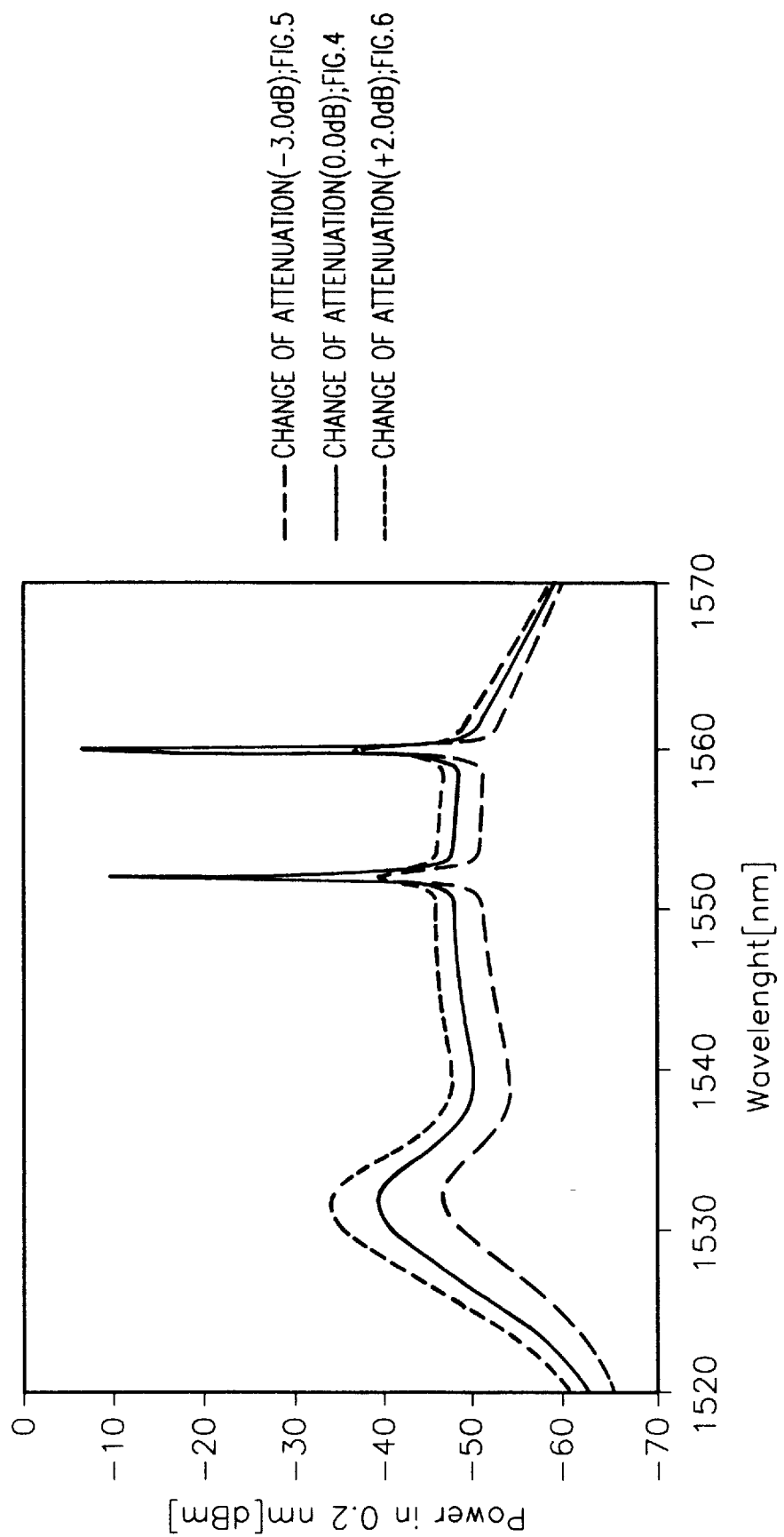
FIG. 7 illustrates a graph of a composite output spectrum comprising the spectra of FIGS. 4–6.

The attenuators were adjusted so that lasing occurred simultaneously at the two wavelengths, with approximately the same out-coupled power for both wavelengths. Then, the attenuation in a number of attenuators was adjusted, and the change of the out-coupled power was measured. FIGS. 4–6 show how the output spectrum changed when all the attenuators were varied together by equal amounts. In this case, both EDFAs were based on the same type of gain medium, namely, high aluminum content germanosilicate EDFs. The lasing wavelengths were 1551.8 nm and 1559.8 nm. In FIG. 4, the powers are approximately equal. In FIG. 5, the attenuation in all attenuators was decreased by 3.0 dB, which led to an increase of power at the long wavelength (1559.8 nm), but also a large decrease of power at the short wavelength (1551.8 nm). On the other hand, in FIG. 6, the attenuation in all attenuators was decreased by 2.0 dB from the position of FIG. 4, which led to opposite effects in the relative powers. In FIG. 7, an output spectrum of a double-wavelength ring laser covering FIGS. 4–6 is shown.

Figure 8:
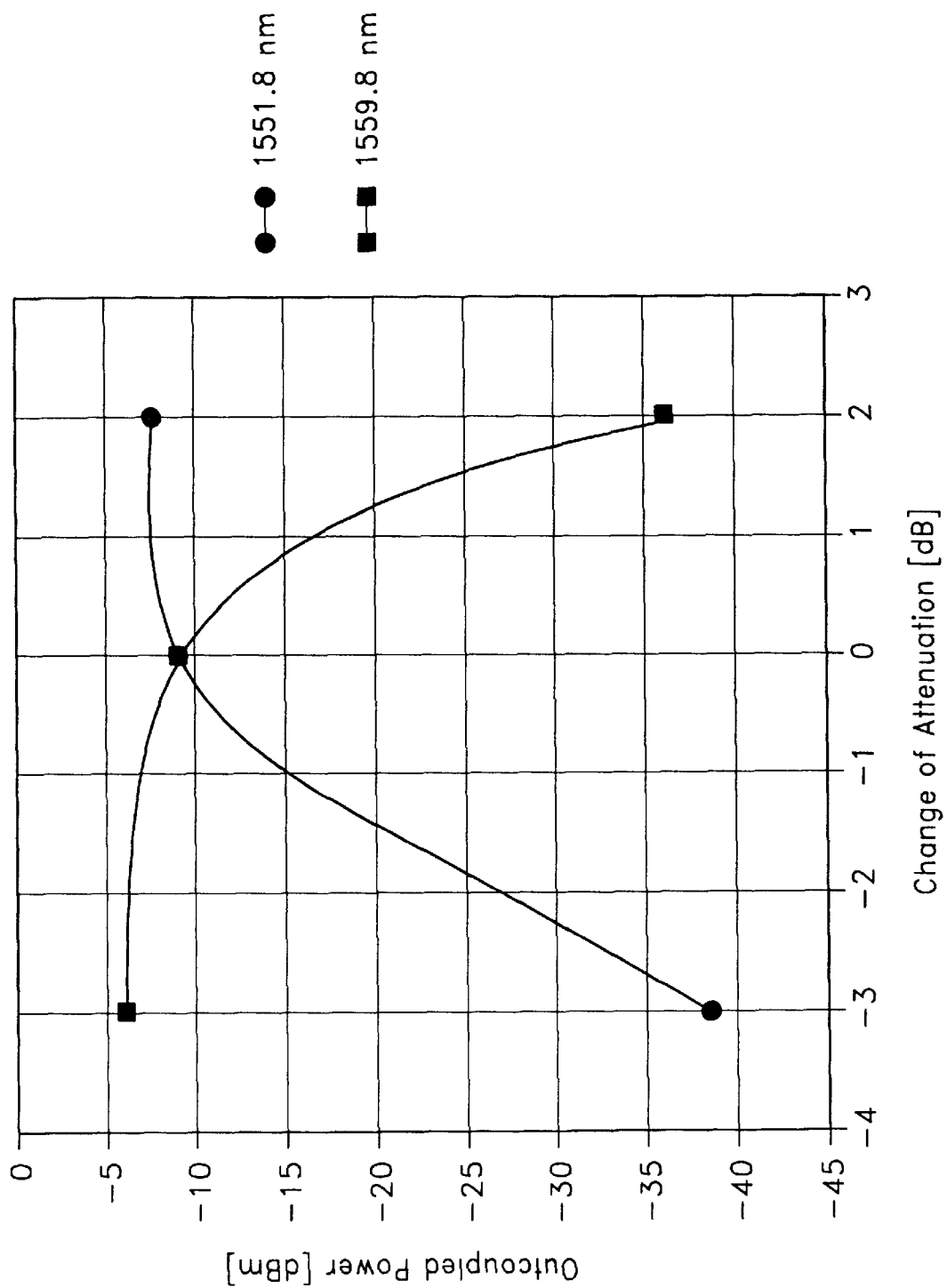
FIG. 8 illustrates a graph of output power for two different wavelengths of 1551.8 nm and 1559.8 nm in a dual wavelength ring laser based on two EDFAs using high aluminum content alumino-gennanosilicate EDFs, when all attenuators are uniformly changed.

In FIG. 8, the powers at the two wavelengths are plotted vs. change in attenuation. The attenuation was changed by an equal amount in all attenuators, from the reference position of FIG. 4. It is noted that an increased cavity loss shifts the lasing (peak gain of the EDFAs) to shorter wavelengths. This is a normal effect of cascaded EDFAs based on similar gain media. This implies that lasing at two different wavelengths cannot be maintained over a range of different values of attenuation between the EDFAs.

Figure 9:
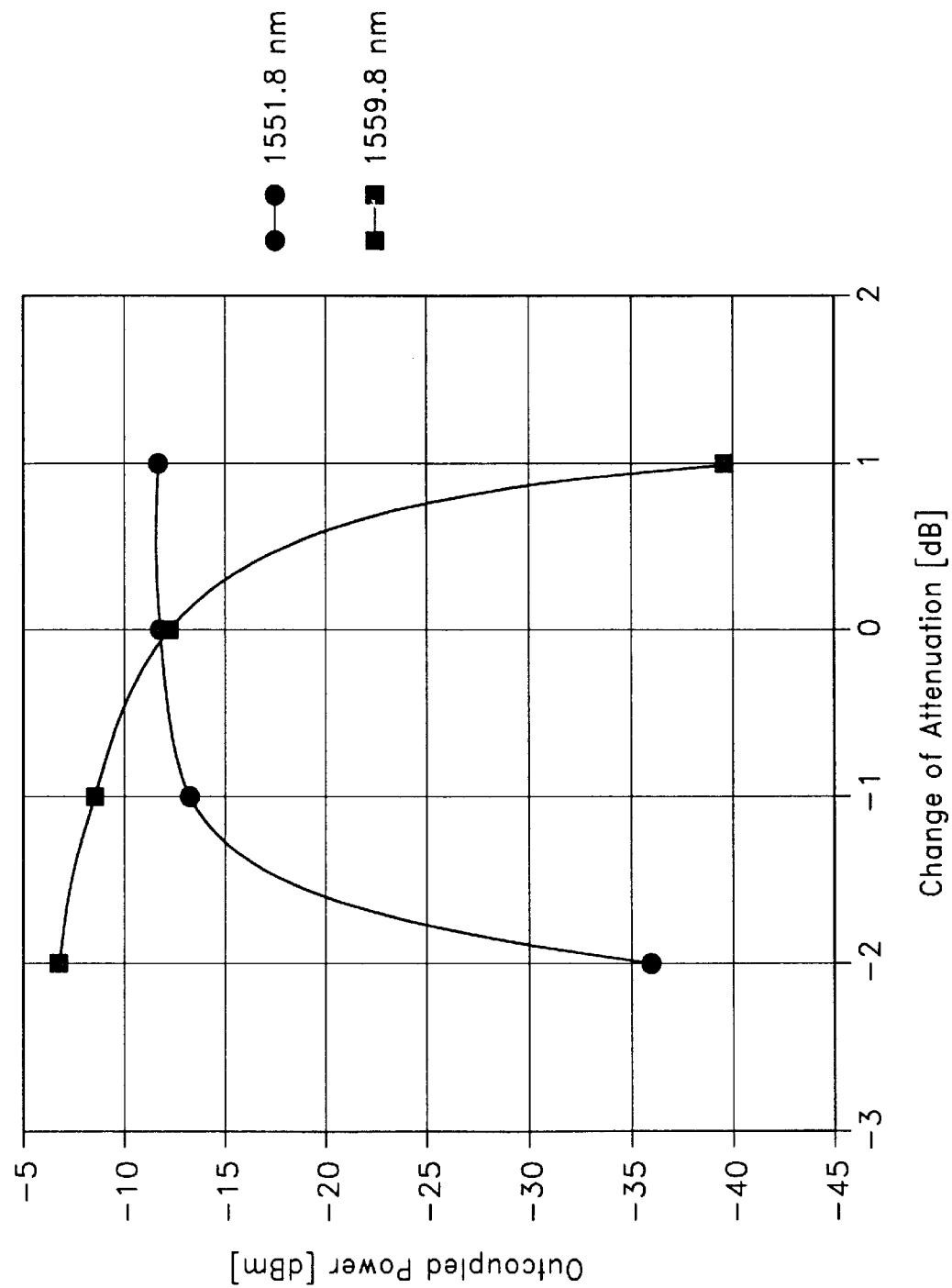
FIG. 9 illustrates a graph of output power for two different wavelengths of 1551.8 nm and 1559.8 nm in a dual wavelength ring laser based on an EDFA using high aluminum content alumino-germanosilicate EDFs and an EDFA using high aluminum-free germanosilicate EDFs, when all attenuators are uniformly changed.

FIG. 9 shows output power according to attenuation variations of the double-wavelength ring laser in case of EDFAs based on different gain media, that is, EDFA A based on a high aluminum content alumino-germanosilicate EDF, and EDFA B based on an aluminum-free germanosilicate EDF. The curves of FIG. 9 are similar to and even worse than those in FIG. 8.

Figure 10:
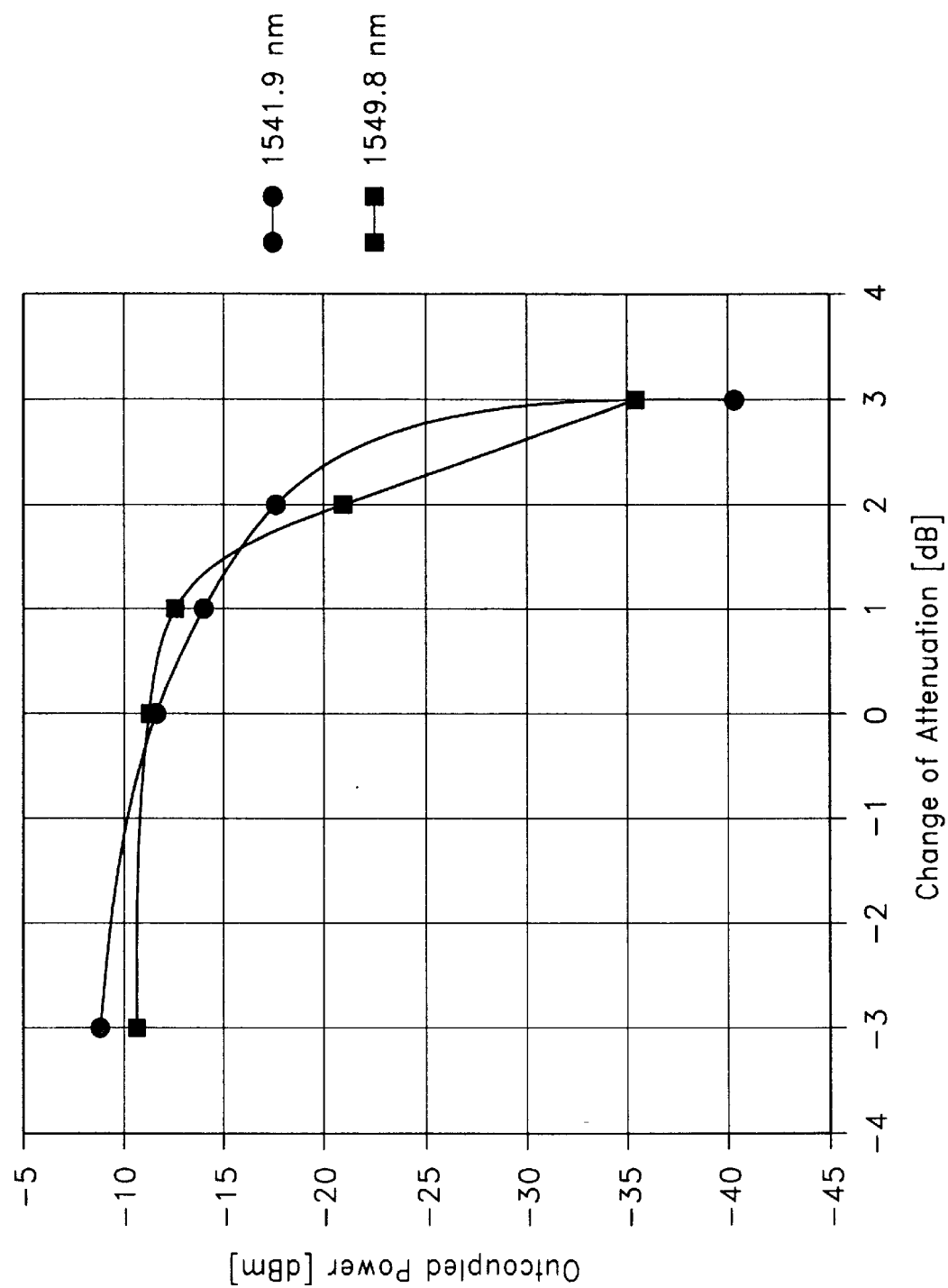
FIG. 10 illustrates a graph of output power for two different wavelengths of 1541.9 nm and 1549.8 nm in a dual wavelength ring laser based on an EDFA using high aluminum content alumino-germanosilicate EDFs and an EDFA using aluminum-free germanosilicate EDFs, when all attenuators are uniformly changed.

FIG. 10 shows an output power when the lasing wavelengths have been changed to 1541.9 nm and 1549.8 nm. Here, lasing at both wavelengths is maintained though the attenuation is varied) until the powers at both wavelengths become negligibly small at approximately the same time.

Figure 12:
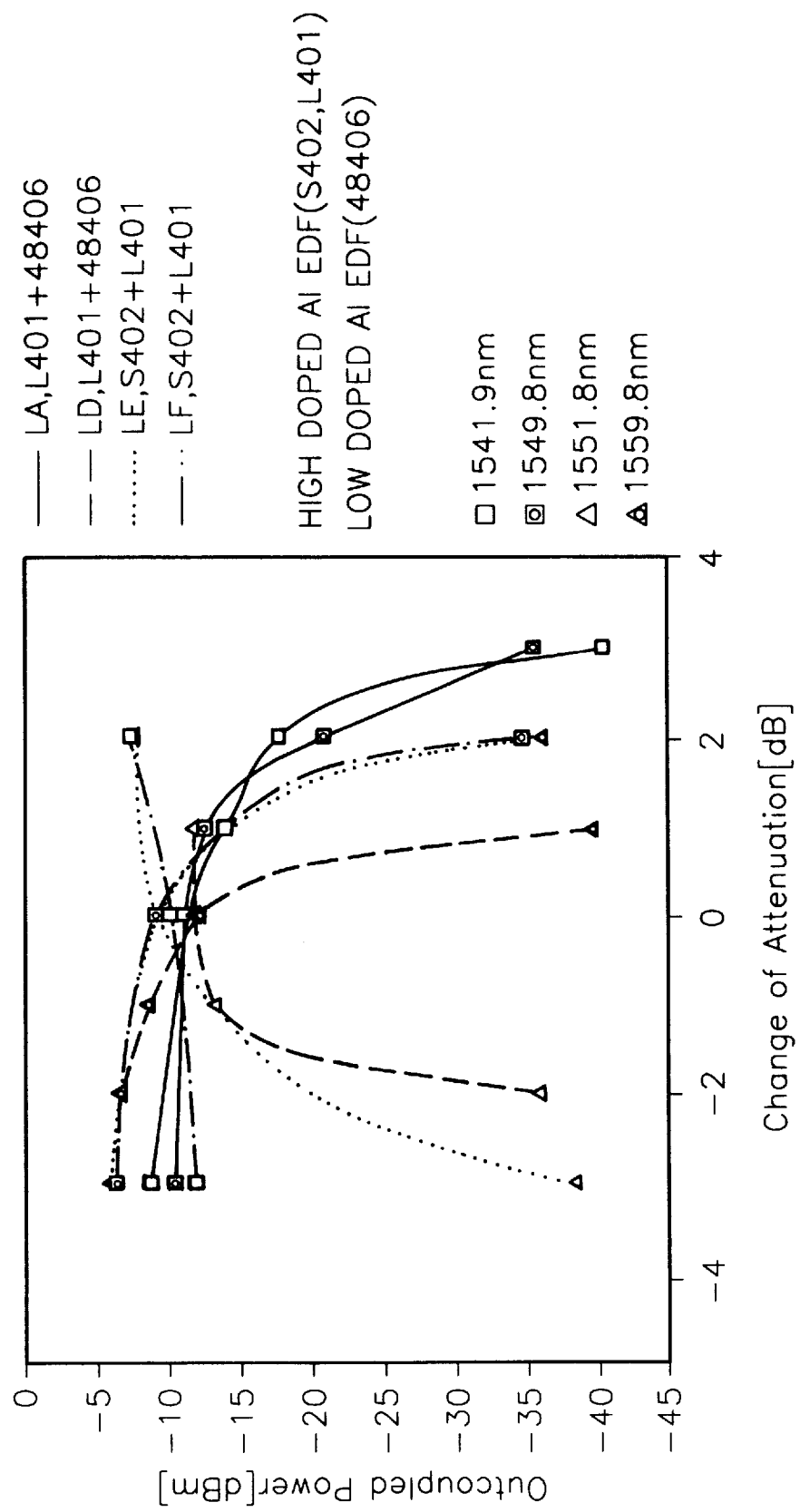
FIG. 12 is a composite plot of the output power plots of FIGS. 8–11.

FIG. 12 shows an output power of the outcoupled light according to attenuation variations, imposed upon the devices corresponding to FIGS. 8–10.

Figure 13:
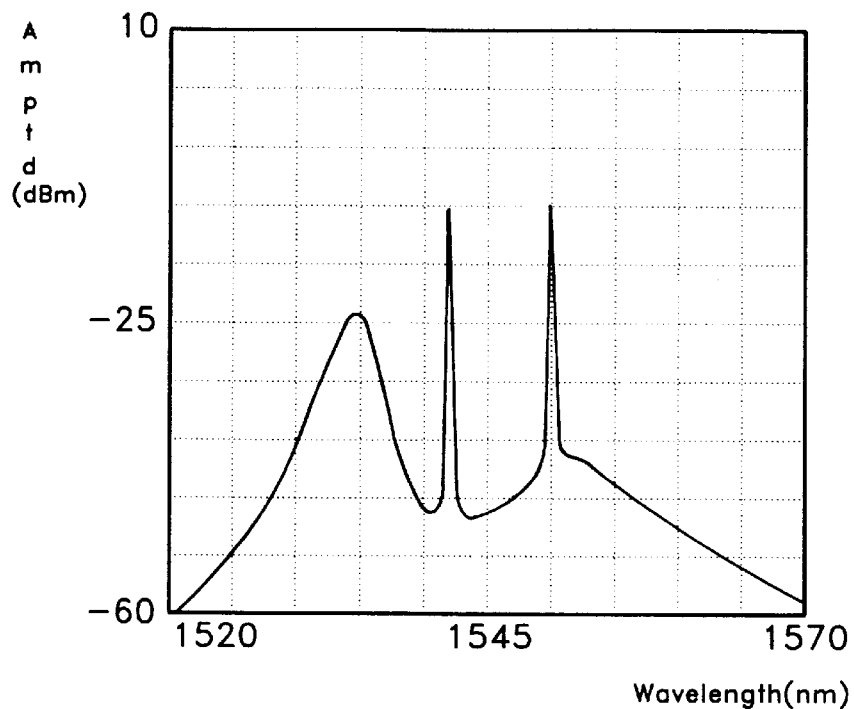
FIG. 13 illustrates a graph of an output spectrum for the reference attenuator setting (corresponding to a 0 Db attenuator change in all attenuators) of the device whose output is shown in FIG. 10.
Figure 14:
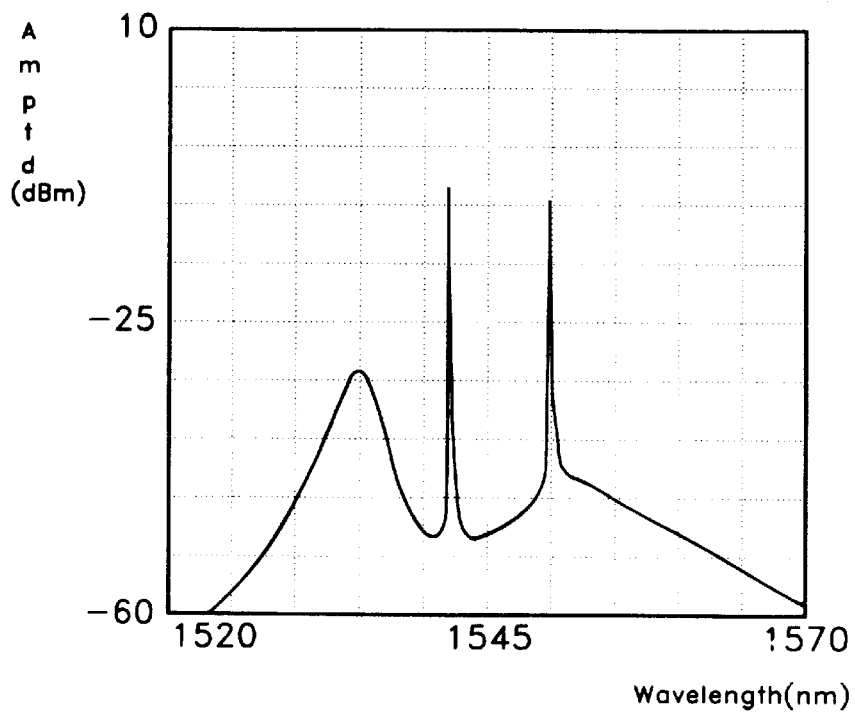
FIG. 14 illustrates a graph of an output spectrum when attenuation is changed by –3.0 dB in all attenuators of the device whose output is shown in FIG. 10.
Figure 15:
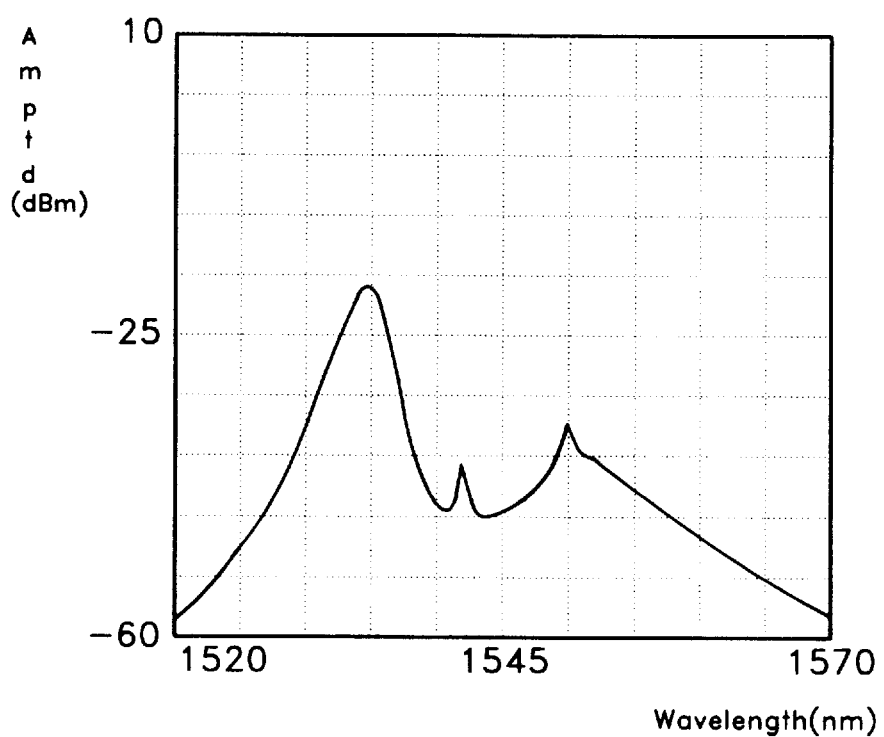
FIG. 15 illustrates a graph of an output spectrum when attenuation is changed by +3.0 dB in all attenuators of the device whose output is shown in FIG. 10.

FIGS. 13–15 shows some examples of spectra of the out-coupled light for the device of FIG. 10. FIG. 13 shows the resulting output power spectrum when the attenuation of the attenuators is adjusted to give almost the same powers at both wavelengths. In FIG. 14, the attenuation of the attenuators was decreased in unison by 3 dB, and in FIG. 15, it was increased from the position of that in FIG. 13 by 3 dB. While lasing has practically ceased in FIG. 15, there is no indication that lasing would stop at lower attenuations, as it did in FIGS. 8 and 9. This is a new and unexpected result.

Figure 11:
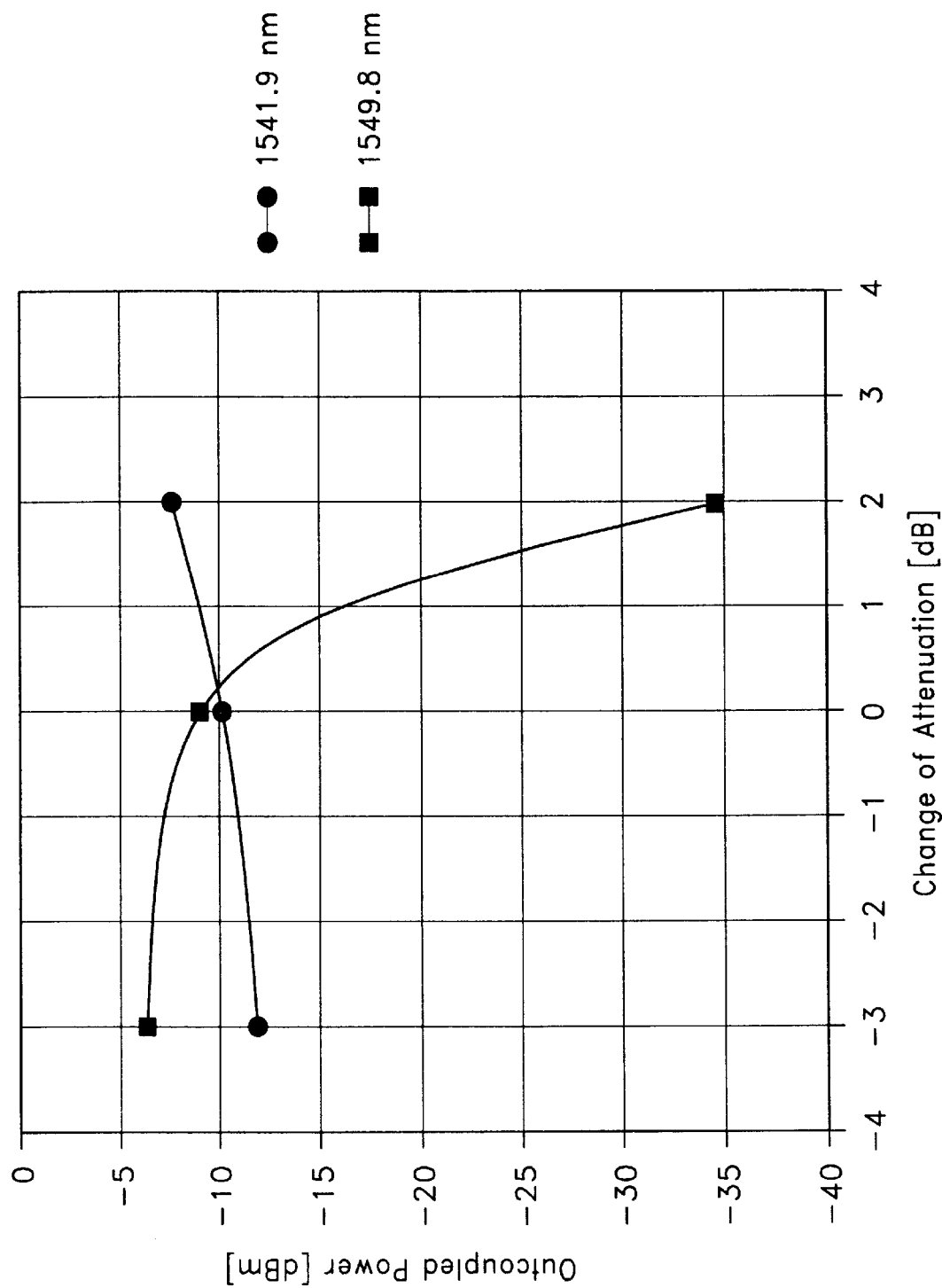
FIG. 11 illustrates a graph of output power for two different wavelengths of 1541.9 nm and 1549.8 nm in a dual wavelength ring laser based on two EDFAs using high aluminum content alumino-gennanosilicate EDFs, when all attenuators are uniformly changed.

FIG. 11 shows the result of maintaining the same wavelengths as in FIGS. 10 and 13–15, based on two high aluminum content EDFs. An improvement is observed compared to FIG. 8, although not as marked as in FIG. 10.

Figure 16:
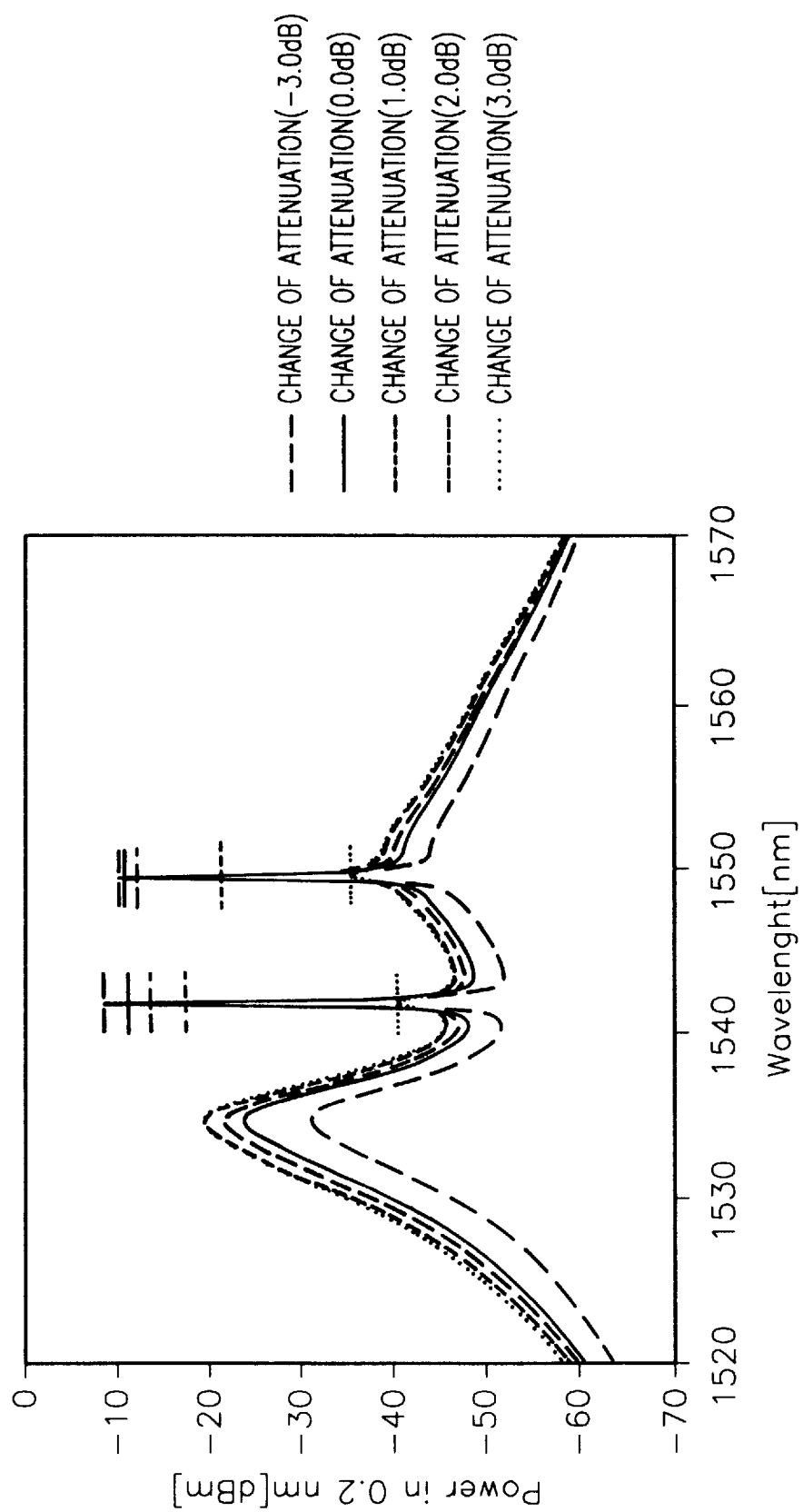
FIG. 16 illustrates a graph of a composite output spectrum of a dual wavelength ring laser when attenuation is changed by 1.0 and 2.0 dB, respectively, in all attenuators of the device whose output is shown in FIG. 10, together with the output spectra of FIGS. 13–15.

FIG. 16 illustrates an output spectrum of the double-wavelength ring laser with attenuation variations of 1.0 and 2.0 dB in all attenuators of the devices corresponding to FIGS. 13–15.

In conclusion, for the device of FIG. 10, and for FIGS. 13–16, the power at both wavelengths remains approximately the same if the attenuation between amplifiers diange by equal amounts at both wavelengths. The device represents a new way of obtaining this important property.

Figure 17:
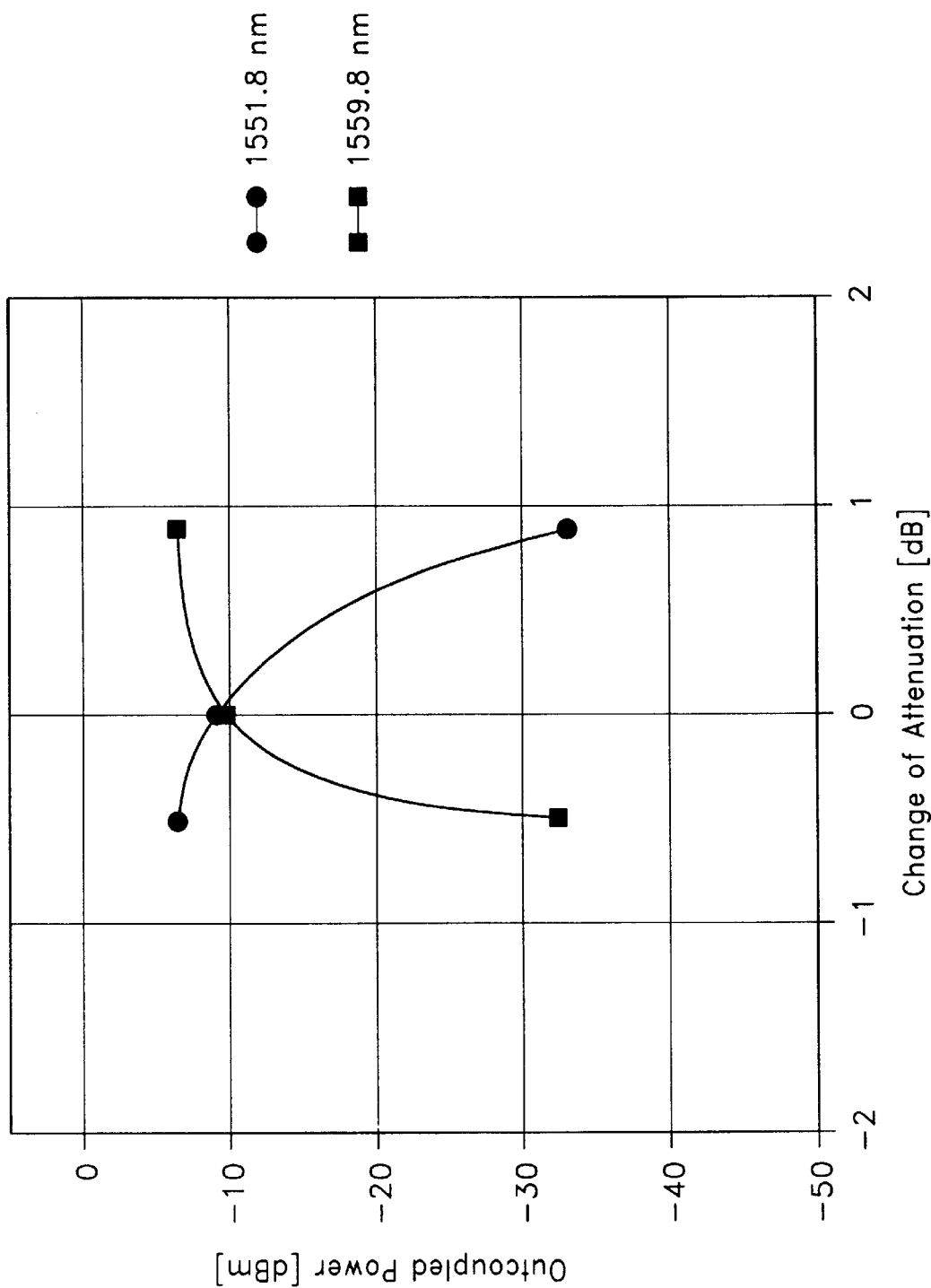
FIG. 17 illustrates a graph of an output power of a dual wavelength ring laser based on two EDFAs using high aluminum content alumino-germanosilicate EDFs for two different wavelengths of 1551,8 nm and 1559.8 nm, when only one of the attenuators of FIG. 2 is changed from a reference position, thereby affecting only one of the two wavelengths.
Figure 18:
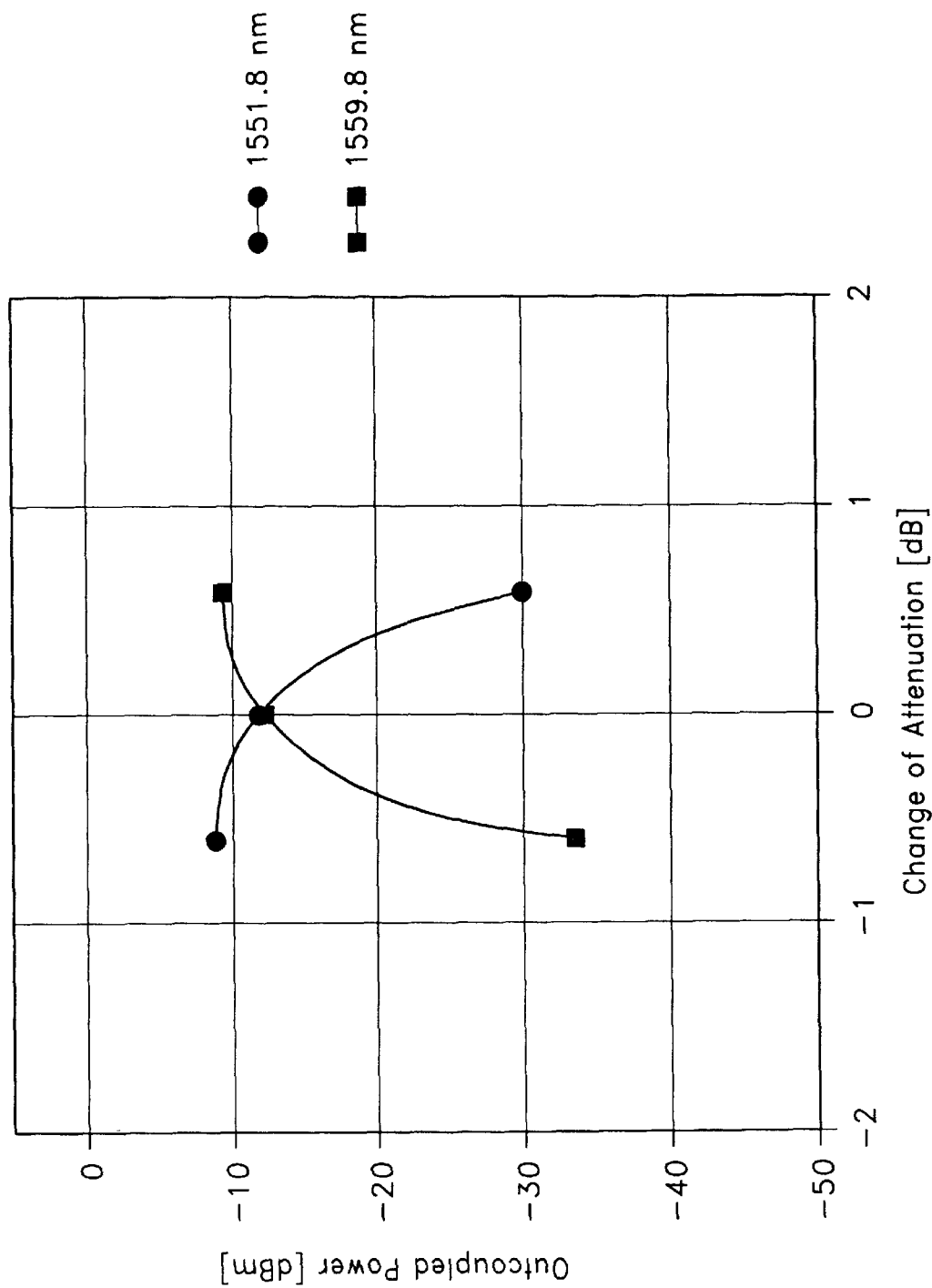
FIG. 18 illustrates a graph of an output power of a dual wavelength ring laser based on an EDFA using high aluminum content alumino-germanosilicate EDFs and an EDFA using aluminum-free germanosilicate EDFs for two different wavelengths of 1551,8 nm and 1559.8 nm, when only one of the attenuators of FIG. 2 is changed from a reference position, thereby affecting only one of the two wavelengths.
Figure 19:
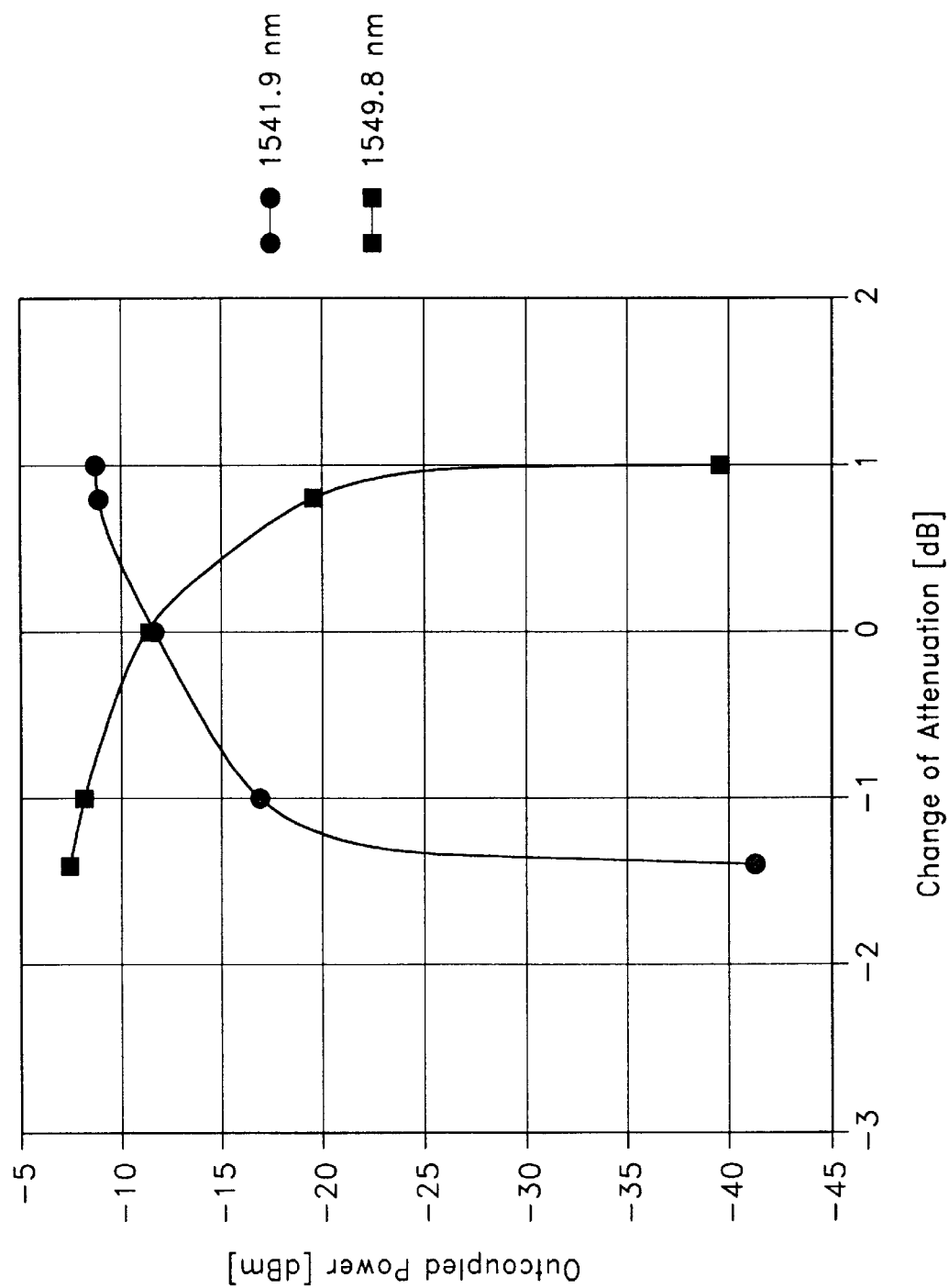
FIG. 19 illustrates a graph of an output power of a dual wavelength ring laser based on an EDFA using high aluminum content alumino-germanosilicate EDFs and an EDFA using aluminum-free germanosilicate EDFs for two different wavelengths of 1541,9 nm and 1549.8 nm, when only one of the attenuators of FIG. 2 is changed from a reference position, thereby affecting only one of the two wavelengths.
Figure 20:
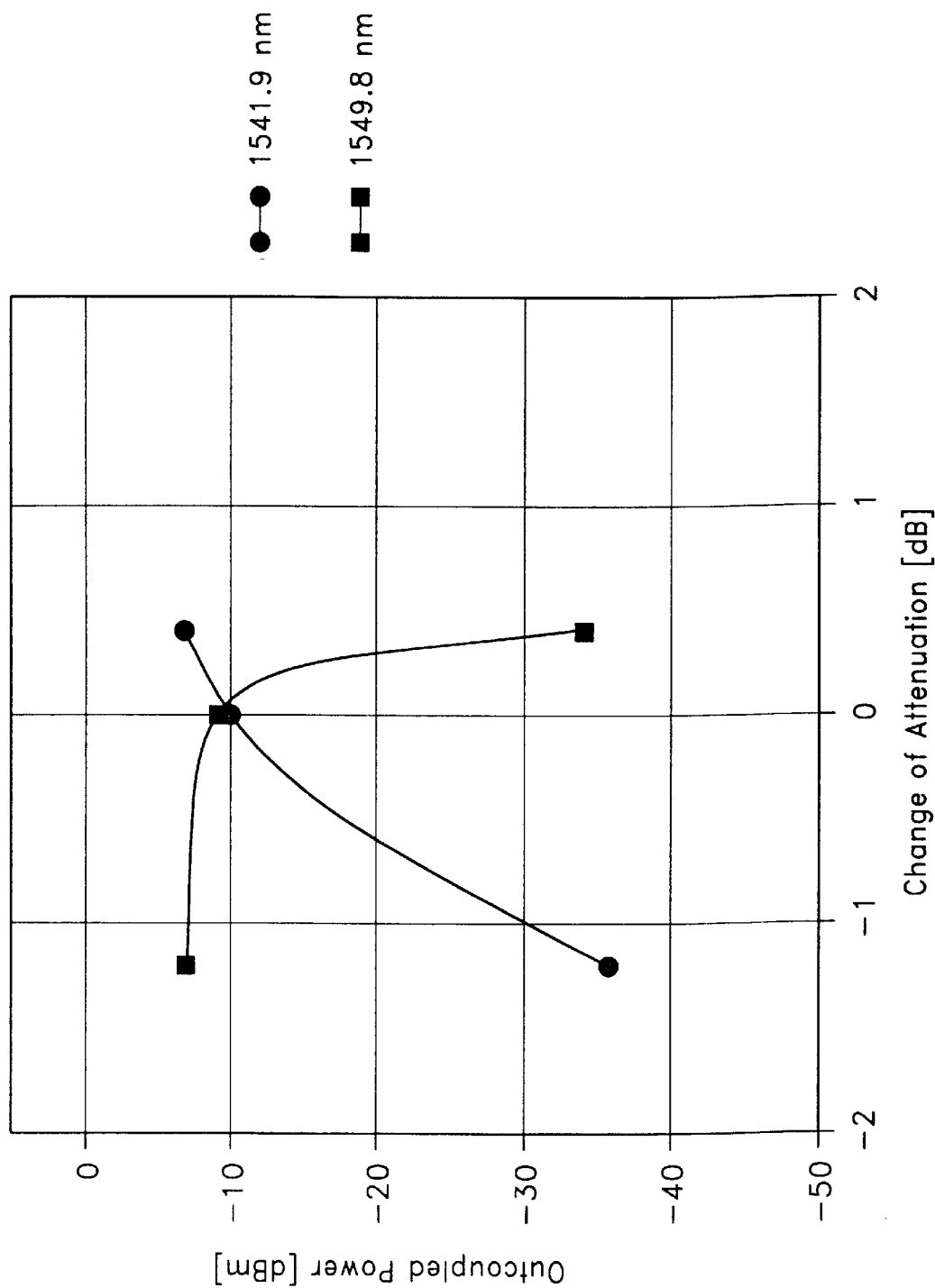
FIG. 20 illustrates a graph of an output power of a dual wavelength ring laser based on two EDFAs using high aluminum content alumino-germanosilicate EDFs for two different wavelengths of 1541,9 nm and 1549.8 nm, when only one of the attenuators of FIG. 2 is changed from a reference position, thereby affecting only one of the two wavelengths.

To know what happens if the attenuation is varied at only one wavelength, the curves in FIG. 17 were measured under the same conditions as in FIG. 8, except that here only one attenuator was varied, affecting the attenuation only at one of the two lasing wavelengths. Significant power was maintained at both wavelengths over a 1 dB range of attenuations. FIG. 18, corresponding to FIG. 9, shows no improvement compared to FIG. 17. However, FIG. 19, corresponding to FIG. 10, shows a significant improvement in that the range of attenuations for which lasing occurs of both wavelengths is about twice as large as in FIGS. 17 and 18. As in FIG. 7, the alternating scheme of the EDFA together with wavelengths at 1541.9 nm and 1549.8 nm shows significantly better characteristics. FIG. 20 corresponds to FIG. 11 and again, the shift of wavelengths shows an improvement, but not as marked as in FIG. 19.

Figure 21:
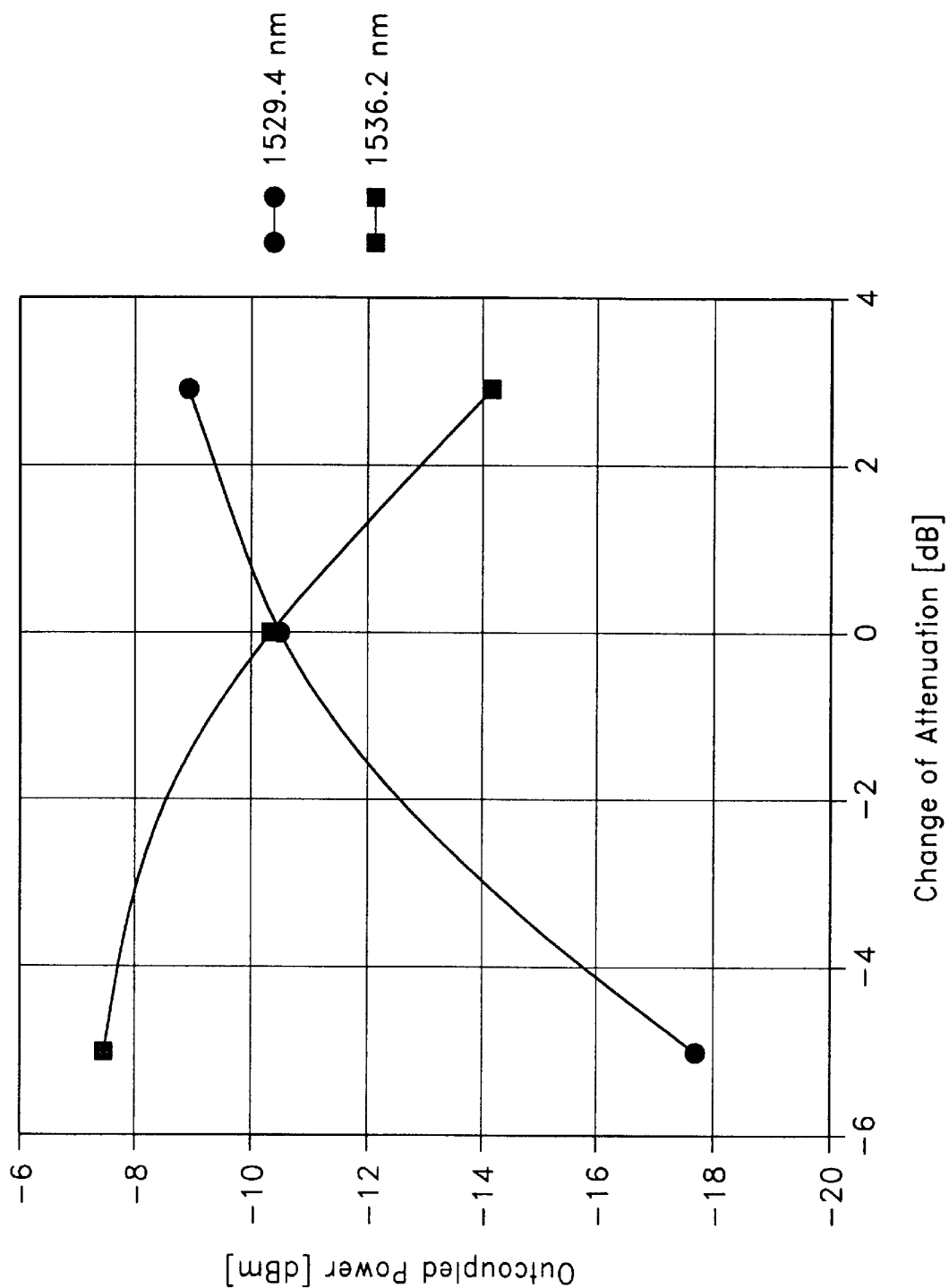
FIG. 21 illustrates a graph of an output power of a dual wavelength ring laser based on an EDFA using high aluminum content alumino-germanosilicate EDFs and an EDFA using aluminum-free germanosilicate EDFs for two different wavelengths of 1529,4 nm and 1536.2 nm, when only one of the attenuators of FIG. 2 is changed from a reference position, thereby affecting only one of the two wavelengths.

Finally, the same combinations of EDFAs as that of the devices corresponding to FIGS. 9, 10, 18 and 19 were used, but at the wavelengths 1529.4 nm and 1536.2 nm That means that at one wavelength the maximum value of the gain swing was nearly achieved in one EDF, while at the other wavelength the peak value of the gain swing was nearly achieved in the other EDF. Thus, as shown in FIG. 21, a remarkable improvement can now be observed Even though the attenuation in one channel was varied by 8 dB, the lasing powers changed by no more than 9 dB. This is a new and unexpected result for homogeneously broadened gain media, which clearly demonstrates the potential of the device to compensate for wavelength-dependent losses.

Figure 22:
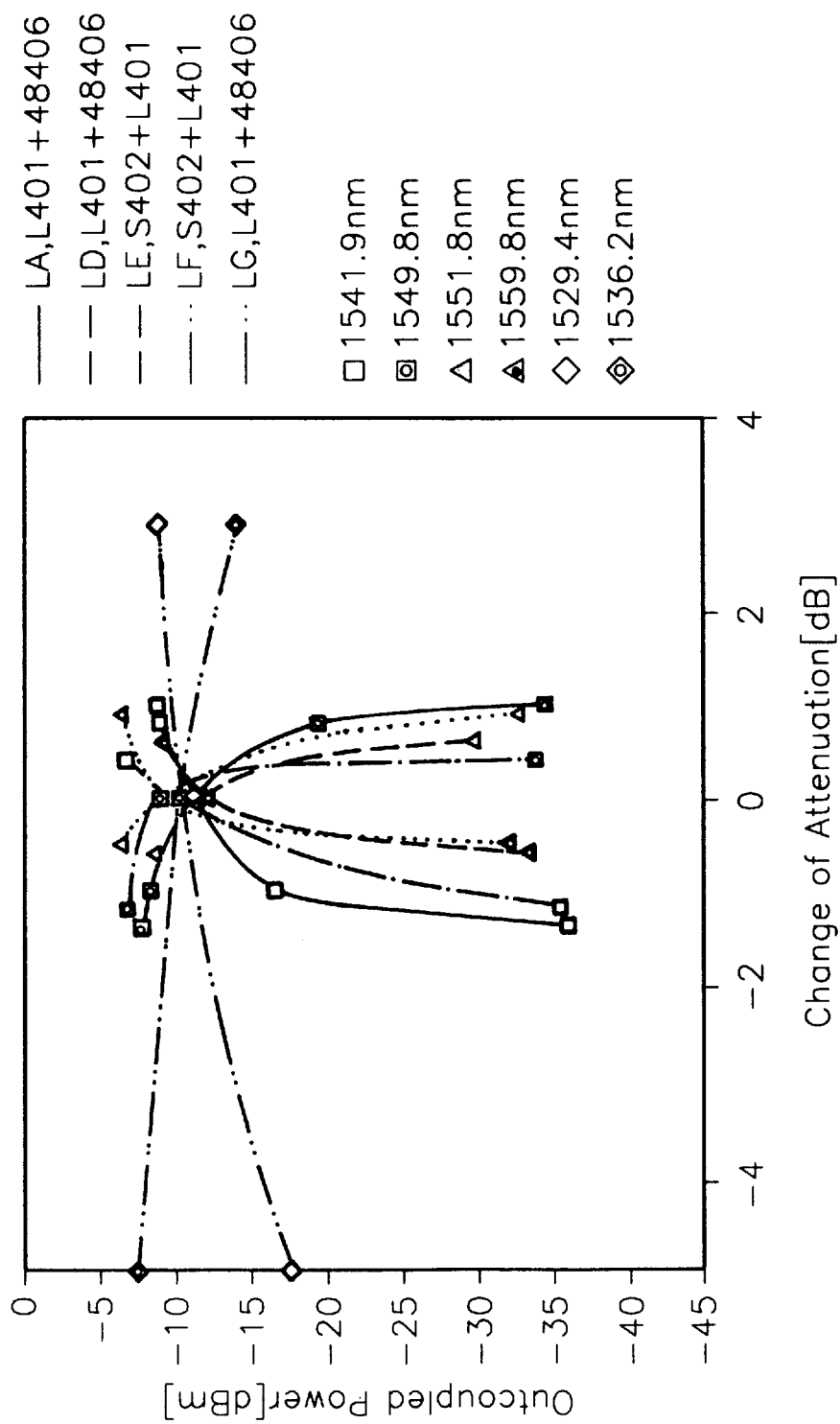
FIG. 22 is a composite diagram that illustrates an out-coupled output power according to attenuation variations at one wavelength only, derived from FIGS. 17–21.

It may be noted that the composite plot of FIG. 22 represents, on the side of increased attenuation, a direct measurement of $G_{2,1}$ (defined below in connection with Equation (5)):

| Laser | $\lambda_1$ [nm] | $\lambda_2$ [nm] | $G_{2,1}$ [dB] |
|---|---|---|---|
| I (LF) | 1541.9 | 1549.8 | 0.4 |
| II (LE) | 1559.9 | 1551.8 | 0.9 |
| III (LA) | 1541.9 | 1549.8 | 1.0 |
| IV (LD) | 1559.9 | 1551.8 | 0.6 |
| V (LG) | 1529.4 | 1536.2 | >2.5 |

Figure 23:
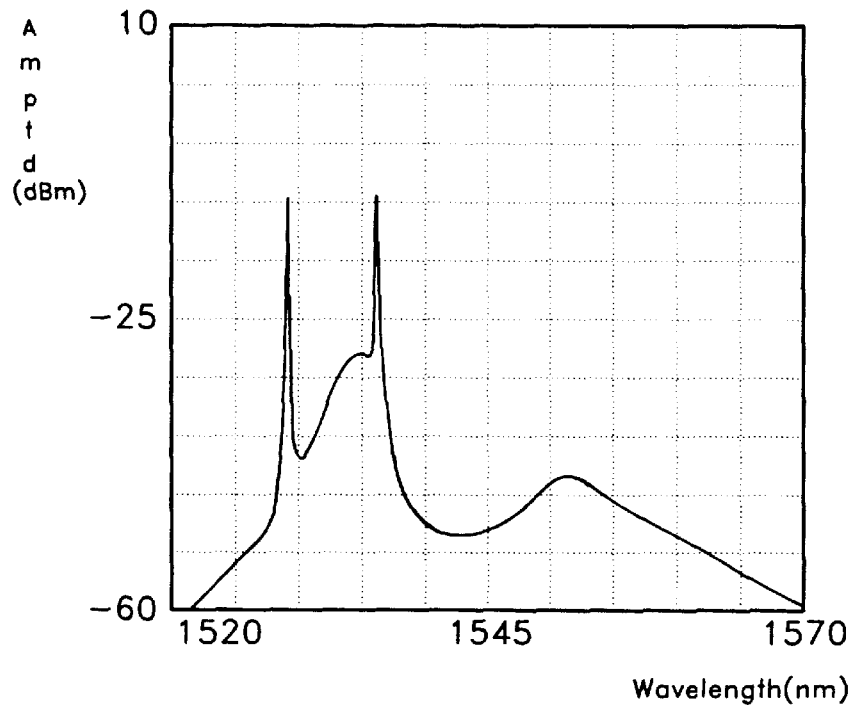
FIG. 23 illustrates a graph of an output spectrum for the reference attenuator setting (corresponding to a 0 dB attenuator change in all attenuators) of the device whose output is shown in FIG. 21.
Figure 24:
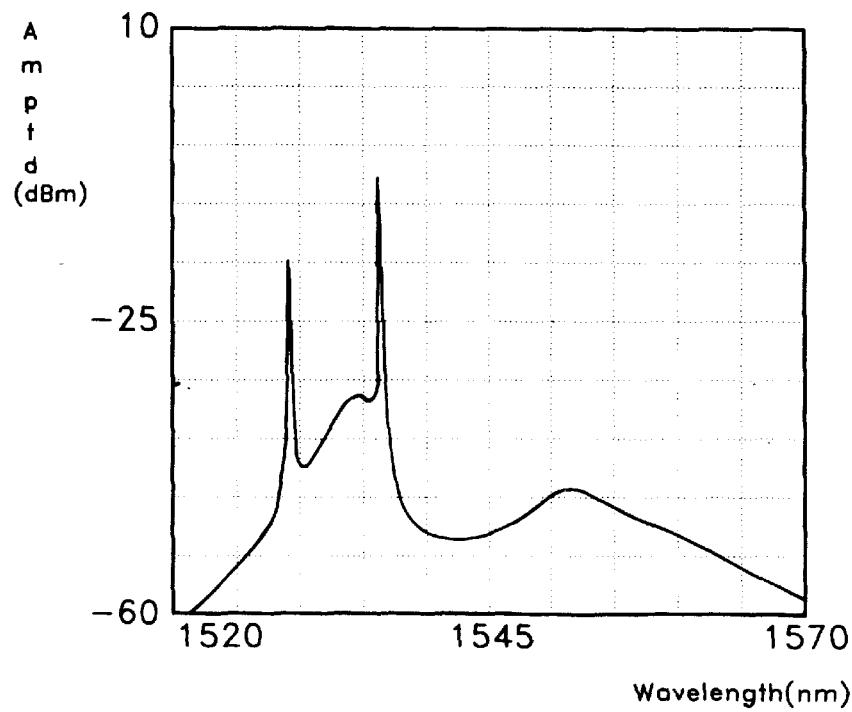
FIG. 24 illustrates a graph of an output spectrum when attenuation is changed by −5.0 dB in all attenuators in FIG. 21.
Figure 25:
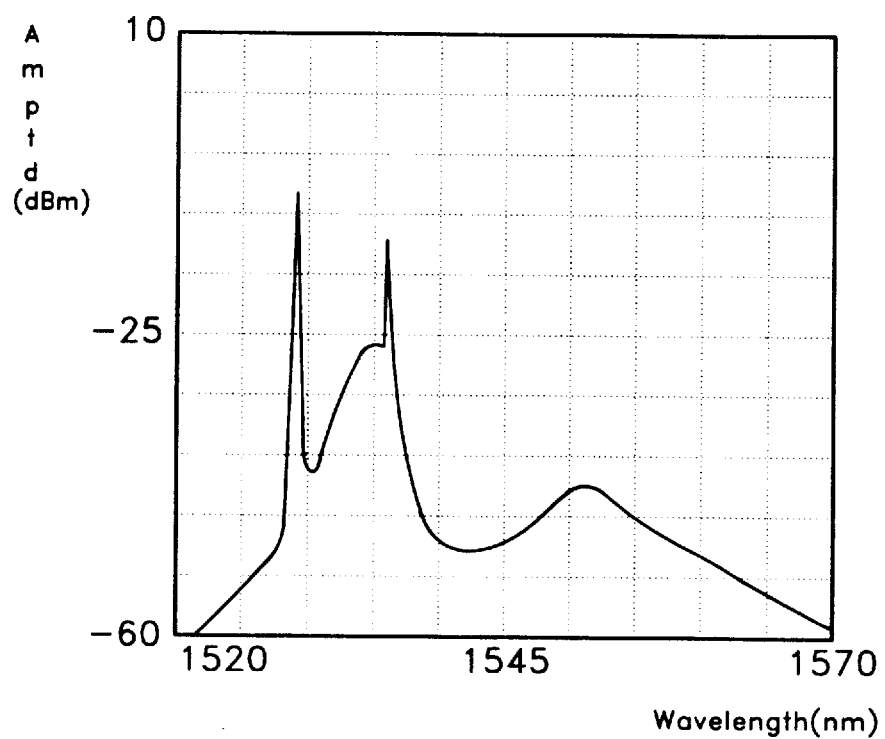
FIG. 25 illustrates a graph of an output spectrum when attenuation is changed by +3.0 dB in all attenuators in FIG. 21.
Figure 26:
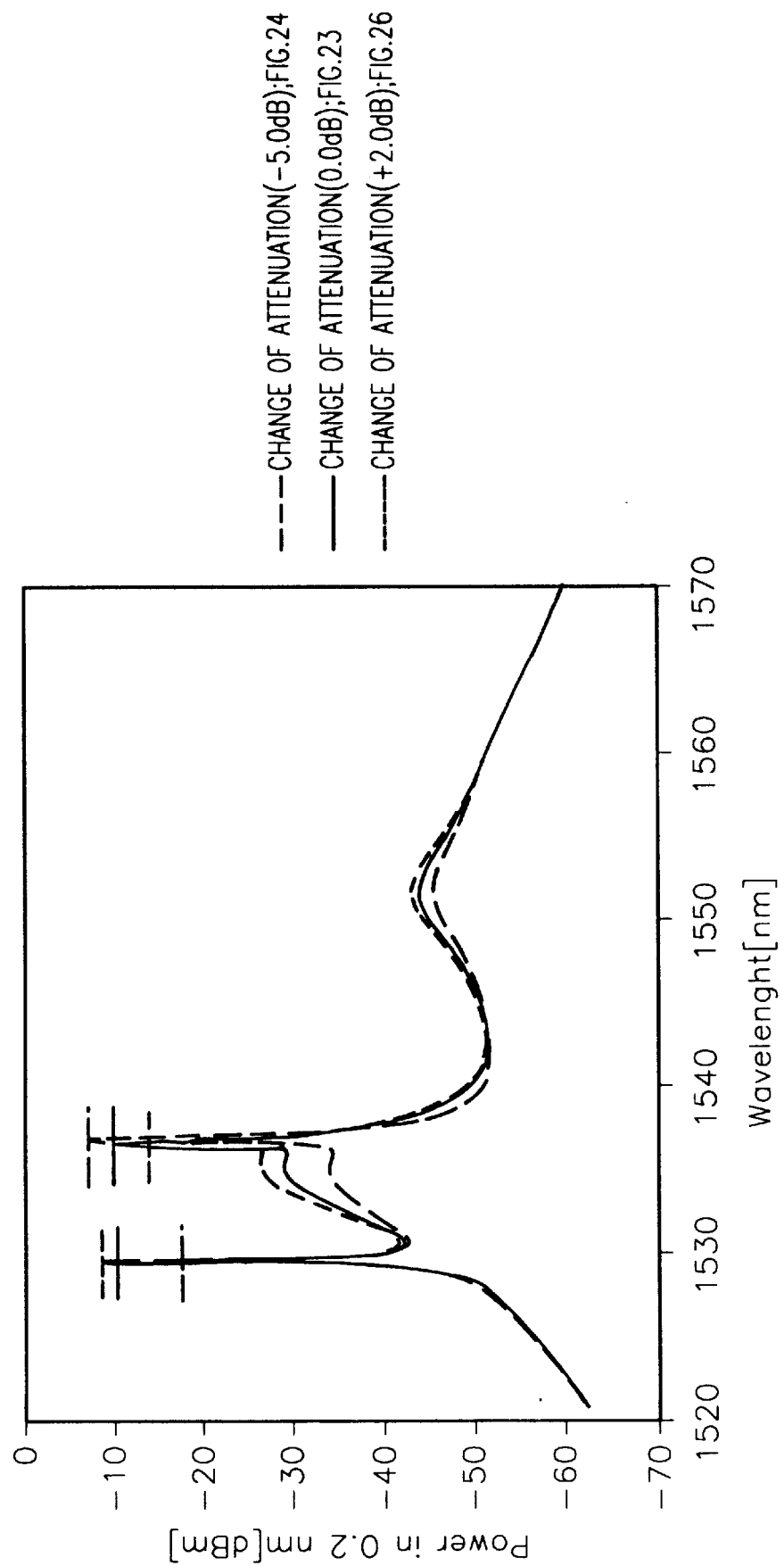
FIG. 26 is a composite diagram that illustrates an output spectrum of a dual wavelength ring laser, derived from FIGS. 23–25.

FIGS. 23–25 show some output spectra of the device corresponding to FIG. 21, when different attenuator settings are applied.

In summary, we can conclude that the insensitivity of dual wavelength lasing to cavity loss can be greatly improved by using two EDFAs based on EDFs of different types, and strongly depends on the choice of wavelengths.

Meanwhile, the manner in which the OAs should be constituted in the case of dual wavelength lasing, with two different gain media will be described. Each OA, in this example, is constituted of only one type of gain medium. FIG. 2 illustrates an example of such a system, although the losses between amplifiers can be of any spectral shape. It is assumed that the system can lase at either one, both or none of the two wavelengths in question, and derive conditions under which the system must lase at both wavelengths. Filtering may be needed to suppress the power at other wavelengths, thus ensuring that the system does not lase at those wavelengths.

When the small signal gain in the gain media is large enough to compensate for the loss at both wavelengths, the laser is above threshold, and will lase at least at one wavelength and possibly at both. Assume that the laser is lasing only at $\lambda_1$. We want to find cavities for which this is not a stable state. This is the case if the gain at $\lambda_2$ is higher than the loss. Thus, we want to fmd cavities in which lasing only at $\lambda_1$ would imply that the gain at $\lambda_2$ is above lasing threshold, and vice versa. Using equation (1), with $f(\lambda)$ representing all the excess loss from the output of one OA to the output of the next one, the degree of excitation $n_2$ can be obtained in the two OAs separately as follows:

$$n_2^{A,B} = (f_1^{A,B} + \alpha_1^{A,B} L^{A,B} + G_{1,1}^{A,B})/L^{A,B} g_{p-p,1}^{A,B} \quad (5)$$

where the subscript "1" indicates a value related to $\lambda_1$. Here, $G_{1,1}^{A(B)}$ is the total gain in dB from the output of OA B(A) to the output of OA A(B3). Hence, $G_{1,1}^A$ means the difference in output powers in dBm between OA A and OA B. This can be considered small for amplifiers working in saturation for the typical case of equal pump power for both gain media. Furthermore, since we assume that the laser is lasing at $\lambda_1$, $G_{1,1}^A$ must equal $-G_{1,1}^B$ in order that the gain equals the loss at $\lambda_1$.

Here, "excess loss" means all the loss which is not included in the resonant $Er^{3+}$ absorption $\alpha L$.

Under the assumption of lasing at $\lambda_1$, the cavity gain $G_{2,1}$ at $\lambda_2$ in the two cascaded OAs is then given by:

$$G_{2,1} = G_{2,1}^A + G_{2,1}^B = (f_1^A + \alpha_1^A)g_{p-p,2}^A/g_{p-p,1}^A - (f_2^A + \alpha_2^A L^A) + \quad (6)$$
$$(f_1^B + \alpha_1^B L^B)g_{p-p,2}^B/g_{p-p,1}^B - (f_2^B + \alpha_2^B L^B) +$$
$$G_{1,1}^A(g_{p-p,2}^A/g_{p-p,1}^A - g_{p-p,2}^B/g_{p-p,1}^B)$$

Here, if $G_{2,1} > 0$, light at $\lambda_2$ will be amplified, and the assumption of lasing only at $\lambda_1$ will be nullified. It is assumed then that the laser instead lases at only $\lambda_2$.

The loop gain $G_{1,2}$ at $\lambda_1$ is given by:

$$G_{1,2} = (f_2^A + \alpha_2^A L^A)g_{p-p,1}^A/g_{p-p,2}^A - (f_1^A + \alpha_1^A L^A) + \quad (7)$$
$$(f_2^B + \alpha_2^B L^B)g_{p-p,1}^B/g_{p-p,2}^B - (f_1^B + \alpha_1^B L^B) +$$
$$G_{2,2}^A(g_{p-p,1}^A/g_{p-p,2}^A - g_{p-p,1}^B/g_{p-p,2}^B)$$

Here, if also $G_{1,2} > 0$, lasing light at $\lambda_1$ will be amplified, and the assumption of lasing only at $\lambda_2$ is also not a stable solution. Thus, it is obvious that the laser must emit at both wavelengths. Clearly, both equations (6) and (7) should result in a value larger than 0 for both wavelengths to lase.

Below follows a description of how both $G_{1,2}$ and $G_{2,1}$ can be made large. It follows that for a cavity where $G_{1,2}$ and $G_{2,1}$ are large, the other parameters (the losses) can vary substantially without making either $G_{1,2}$ or $G_{2,1}$ negative, in which case only one wavelength would lase. The following are some ways in which $G_{1,2}$ and $G_{2,1}$ can be increased.

(1) For a single gain medium, the absorption a at one wavelength should be large if the gain swing thereof is smaller than it is at the other wavelength. Furthermore, if this is the case, the length L should be large. Otherwise the length L should be small from this point of view.

(2) The loss f prior to and inside an OA should be large where $g_{p-p}$ is small. This can be accomplished using a filter. This means that one should use filters to obtain a gain having spikes in different amplifiers, instead of having a flat gain in each individual amplifier. The spikes should occur at different wavelengths in different OAs.

(3) If the laser is made to lase at only one wavelength, e.g. by blocking light at the other one, the gain at the lasing wavelength should increase in the OA for which $g_{p-p\ lasing}/g_{p-p\ blocked}$ is large (compared to the other OA), and thus decrease in the other OA. In other words, the gain should be redistributed to the OA for which the gain swing is relatively small at the lasing wavelength. Mathematically, this can be expressed that in Equation 6

$$G_{1,1}^A(g_{p-p,2}^A - g_{p-p,2}^B/g_{p-p,1}^B) = G_{1,1}^A g_{p-p,2}^A/g_{p-p,1}^A + G_{1,1}^B g_{p-p,2}^B/g_{p-p,1}^B$$

should be as large as possible. (The equivalent expression in Equation 7 should also be as large as possible.) However, for many amplifier designs, this quantity will be negative. In those cases, the amplifier design can be modified to make it a so-called optical limiting amplifier (OLA), by attenuating the signals midway into the amplifier. OLAs can thus be useful in enhancing signalpower induced gain compression.

(4) Another very simple way of equalizing the gain between different types of OAs when only one signal is present is to concatenate several OAs of one type followed by several OAs of the other type. As already mentioned, the quantity $G_{1,1}^A(g_{p-p,2}^A/g_{p-p,1}^A - g_{p-p,2}^B/g_{p-p,1}^B)$ will be negative for many amplifiers cascades. If such amplifiers are cascaded with a period of, say, ten amplifiers, instead of a period of two (a OA A–OA B–OA A–OA B . . . sequence) the difference in gain $G_{1,1}^A$ will become much smaller in each amplifier, since this now becomes the difference in output power divided by five.

(5) The spectra of the gain media should fulfil the following inequality:

$$(g_{p-p,2}^A/g_{p-p,1}^A)(g_{p-p,2}^B - g_{p-p,1}^B) < 0 \quad (8)$$

If the inequality (8) is fulfilled, it is easier to optimize both $G_{1,2}$ and $G_{2,1}$ simultaneously. A very important point is that if $g_{p-p,2}^A/g_{p-p,1}^A = g_{p-p,1}^B/g_{p-p,2}^B$, then the wavelength-independent losses between amplifiers can vary by a large (but equal) amount, without either Equation 6 or Equation 7 becoming negative. Hence, gain media should be chosen so that, for each wavelength, the gain swing is large in one gain medium and small in another gain medium, compared to the gain swings at other wavelengths.

(a) One way of achieving this is to place one wavelength near the peak gain swing in one gain medium, and the other wavelength near the peak gain swing in the other medium.

(b) With EDFAs, it is desirable to operate on the long wavelength side of the peak small signal gain. Here, the gain swing is decreasing steadily with increasing wavelength in most types of EDFs. However, this is not the case for a germanosilicate EDF; it has a second gain swing peak at 1550 nm. Between (say) 1542 mn and 1550 nm, the gain swing increases with wavelength. Hence, the inequality (8) can be fulfilled if the wavelengths lie within, say, 1540 nm and 1552 nm, and one of the EDFs is a germanosilicate type. The other gain medium can be, for instance, a high al-content alumino-germanosilicate EDF or a phosphorous co-doped EDF.

(c) Typically, OAs based on crystalline hosts exhibit a "spiky" spectrum that could be suitable for MAPC. If one signal coincides with a peak and another signal falls in between peaks, and the opposite situation prevails in another gain medium, the gain at the two wavelengths is by large decoupled from each other. The sharp character of the peaks enables the use of many different hosts with many different, non-coincident, peaks.

In the above arguments, the assumption was that the pump powers were equal in all types of OAs. However this is not necessarily so. Different pump powers can be used in the different types of EDFAs. In that case, $G_{1,1}^A$, $G_{1,1}^B$, $G_{2,2}^A$ and $G_{2,2}^B$ will no longer be small, as the saturation output power depends strongly (in dBm, approximately linearly) on the pump power. If the difference in saturation powers is properly accounted for, the analysis above can be used also in that case. In fact, in a design that optimizes Equations 6 and 7, the saturation output powers as well as the pump powers of the OAs will most likely be different. For simplicity, we in any case assume that the saturation powers are equal.

At this time, high-loss, namely, a long-distance WDM transmission will be described. For WDM transmission where the loss in the transmission path is high, many OAs need to be cascaded to compensate for the loss. In order to maintain the power level of the signals, the gain must exactly compensate the loss, as for the ring laser above. Hence, the methods for achieving robust multiwavelength lasing can also be applied to WDM transmission. Then, the OA of FIG. 1 is repeated in an approximately periodic manner. If the OAs are of different types, they can be inserted into the transmission path in an approximately alternating fashion. For instance, the ring laser of FIG. 2 can be "cut open" at an arbitrary point. The resulting so-called chain element (CE) can then be concatenated to a transmission link. Then, some or all of the attenuation provided by the attenuators would be replaced by attenuation in the transmission fiber.

Except for the issues discussed in conjunction with the laser, some other points must also be considered. First of all, signal power differences may arise in the system, because signals are switched in and out midway in the system or signals with different powers are input. Unequal powers lead to small signal to noise ratio (SNR) in channels with low power, and so is undesirable. Thus, signal powers should be equalized. The amount of power equalization in a pair of gain media is given directly by equations (6) and (7) if the signal power in the weak channel is so weak that it does not affect the saturation in the amplifiers, and the signal power at the other wavelength is strong enough to make the gain in the two gain media unity at that wavelength.

Moreover, in signal transmission, noise should be low. Furthermore, while the propagation of signals in the cascade of OAs resembles signals traveling loop after loop in a ring laser, the OAs and the intermediate losses no longer have to be perfectly periodic. Nevertheless, it is assumed that the system is perfectly periodic. Hence, the design criteria for the ring laser can be applied also in this case. Though deviations from the periodic schemes disturb signal power, MAPC or ALTC from the above technology copes with the disturbance. In any case, noise will increase.

Even with a perfectly periodic scheme, the SNR will increase compared to one wavelength transmission. The SNR is normally determined predominantly by the input powers to the OAs. First of all, assuming that the total signal power is limited, the power has to be distributed on, say, two channels, in the case of WDM. This decreases the signal power per channel by 3 dB, and the SNR is by approximately the same amount. Furthermore, the SNR degrades even more if the signal powers are not equally distributed among the channels. This is the case if the channel powers differ by some constant amount along the transmission path, and if the power in the signal oscillates between the channels.

Finally, the excess noise in the OAs may increase somewhat. Here, WDM transmission places some extra requirements on the OAs, hence the freedom in amplifier design decreases somewhat. This may lead to a higher excess noise than for single wavelength transmission. Nevertheless, a number of well-known methods may be used for noise reduction, including smaller spacing, namely, lower loss, between the amplifiers.

Now, it will be described how power variations can be kept at a minimum. Previously, dual wavelength lasing was ensured by re-distributing gain between the OAs when one channel started to fade. With only one channel, the gain in both OAs became approximately equal at the remaining strong channel wavelength ($G_{1,1}^A$, $G_{1,1}^B$, $G_{2,2}^A$, and $G_{2,2}^B$ were all small). Since a redistribution makes the gain equal, the gain at the normal operating conditions, with no channel fading, must be unequal. This in turn implies that for a given channel under normal operating conditions, the output powers from the OAs must be different for OAs of type A and type B. For a given minimum loss between amplifiers, this implies that the input power to one OA is lower than it could otherwise be. This reduces the SNR.

It would be much better if the gain was the same for both types of OAs and at both wavelengths. However, then no re-distribution of the gain would occur when one signal fades, as long as the typical situation of nearly equal gain between the OAs when there is only one signal prevails. OLAs represent a way of breaking the normal rule: With one signal fading away (being negligible) and hence with only one strong signal remaining, a larger input power results in a smaller output power in one OA (say, A) where significant limiting occurs, with the opposite situation in OA B. Hence, OLAs allow for an unequal gain between the OAs to develop at the power-dominant channel, and therefore, OLAs can allow for the needed gain distribution even if the gain is evenly distributed between the OAs under normal operating conditions.

Still, there are a couple of drawbacks with OLAs: first of all, the oscillating behavior of the gain with only one signal present makes the link noisier than it would otherwise be. For the same reason, when one channel becomes weak both channels become nosier than they would otherwise be. In addition, the OLA relies on an extra loss introduced in the OAs. In an OLA, significant amounts of power are thus lost. The lower power levels will lead to a noisier system.

Clearly, a redistribution of the gain between amplifiers necessarily implies that the link is noisier than necessary under some operating conditions. From this point-of-view, it would be better if the gain could be redistributed between different gain media within each amplifier. Thus, the use of OAs where each OA consists of at least two types of gain media (so-called hybrid OAs) can be advantageous here. Gain media can optionally be combined in different ways, to form at least two types of different OAs. The OAs may optionally be cascaded in an alternating fashion.

Many examples of hybrid EDFAs exist in the literature. However, except for those with some sort of electronic control that for example changes the gain in the different gain media by changing their pump power, no MAPC/ MAGC has been demonstrated in those devices. Moreover, they have not been designed in accordance with the description in this document, so no MAPC/MAGC is to be expected.

The above paragraphs gave a description of MAPC for the case in which there are as many wavelengths as there are gain media. Equation (4) provides a good reason in that the gain according to equation (4) cannot vary independently at more wavelengths than there are gain media. To have one suitable type of gain medium for every wavelength and combine them into a link for stable WDM transmission or lasing is a difficult proposition when the number of wavelengths grows. However, even with for instance two gain media, multiwavelength transmission and lasing can benefit from the described scheme. Even though equation (4) does not allow the gain to perfectly compensate the loss at all wavelengths, the discrepancies between gain and loss can be smaller than they would be in a transmission according to the prior art. For instance, a loss that changes with the wavelength at a constant rate over a range of wavelengths (a constant loss tilt) can be perfectly compensated for at all wavelengths in that range by gain media where the gain changes with wavelength at a constant rate (a constant gain tilt). The OAs disclosed here can compensate the losses even as the wavelength dependence of the loss changes. For one reason or another, the loss tilt may deviate from that assumed in the design of the system. In traditional cascades of homogeneously broadened OAs, this will then break the required gain-loss match over said wavelength range, so the range cannot be used for WDM transmission. In contrast to prior-art OAs based on homogeneously broadened gain media, the OAs disclosed here can automatically adjust their (overall) gain tilt to compensate any deviation of the loss tilt. We denote this feature "automatic loss tilt compensation" (ALTC).

Figure 27:
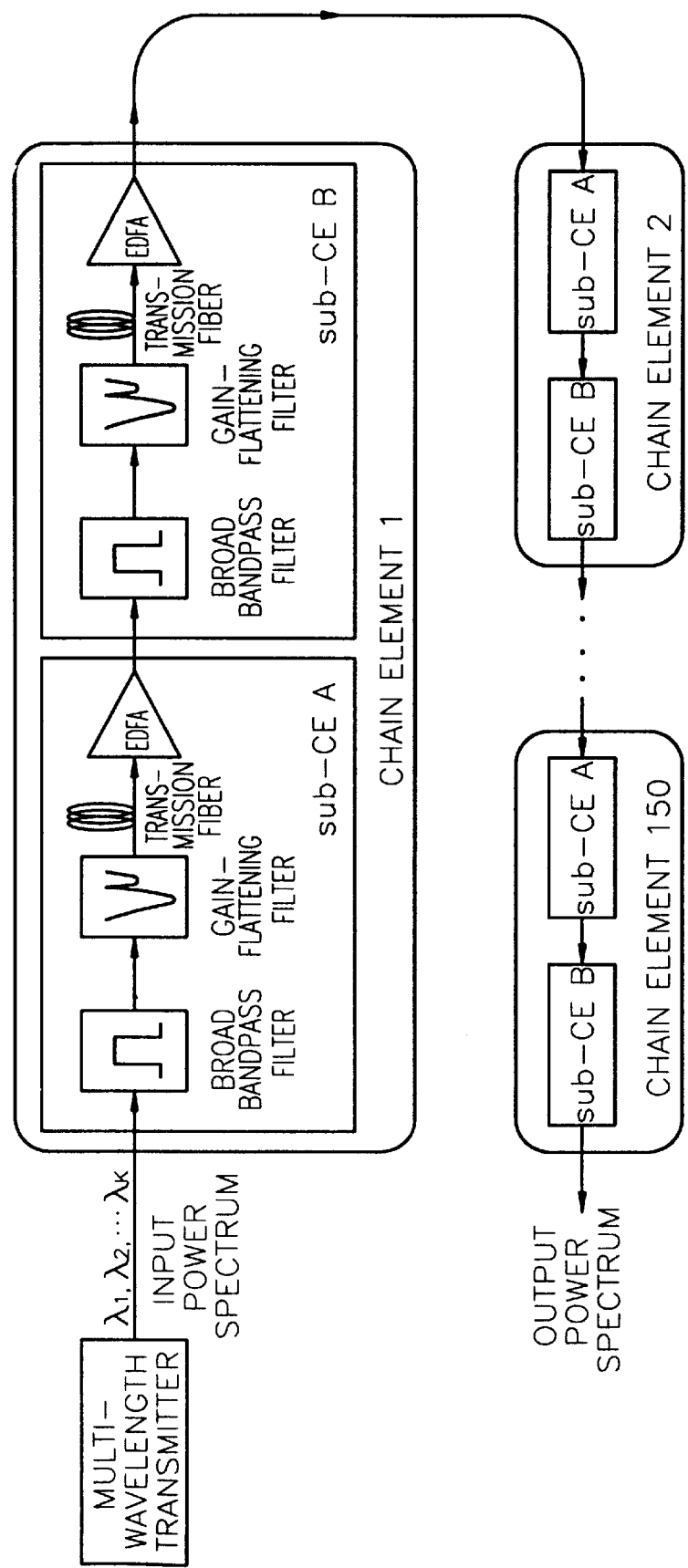
FIG. 27 is a schematic drawing of a studied cascade, where a number k of different wavelengths are propagated through a cascade of 150 different chain elements (CE), each of which consists of two sub-CE, whereby in total the cascade is 300 EDFAs long.

Consequently, according to preferred embodiments of the present invention, the optical amplifier and the cascade thereof can automatically perform power and gain control at multiwavelengths without any external electronic circuits and automatically compensate for loss tilt To illustrate this point further, consider the example of FIG. 27. It depicts a long-distance multiwavelength, optically amplified transmission link. An ensemble of signals is launched into the link, which consists of a total of 300 EDFAs, each preceded by a piece of transmission fiber. An optical isolator is included in each EDFA, thereby preventing any light in a given EDFA from reaching previous EDFAs. Furthermore, bandpass and gain-flattening filters precede the EDFAs. The EDFAs are either identical (based on germanium-free aluminosilicate EDF), or every second EDFA is based on a germanosilicate EDF, while an aluminosilicate EDF was used in the other EDFAs. The transmission link was exactly repeated every or every second EDFA. We divide the link into chain elements (CEs), so that a CE starts at the output of one EDFA and ends at the output of the second EDFA that follows. Hence, the cascade consists of 150 CEs, each comprising two stretches of transmission fiber, two EDFAs, and a number of filters. Similarly, we divide each CE into two sub-CEs, each consisting of a stretch of transmission fiber, and optionally of filters, followed by an EDFA. We study three possible configurations according to Table ALTC1 below.

TABLE ALTC1

| System | Type of cascade | Wavelength range of band-pass filter | Location of gain-flattening filter |
|---|---|---|---|
| A | homogeneous cascade of aluminosilicate EDFAs | 1553–1559 nm | In every sub-CE |
| B | alternating alumino- and germano-silicate EDFAs | 1553–1559 nm | In every sub-CE |
| C | alternating alumino- and germano-silicate EDFAs | 1553–1559 nm | Only in sub-CE with alumino-silicate EDFAs |

Here, system A is a typical non-alternating prior-art system. System B is a system with EDFAs of alternating types but which does not make Equations 6 and 7 larger than zero simultaneously for any two wavelengths in the wavelength range transmitted by the cascade. In particular, it fails to satisfy Equation 8. System C, finally, is a cascade of alternating EDPAs of the type proposed here. It satisfies Equation 8 for all wavelength pairs in its transmitted wavelength range. All systems were designed for a link loss of 10 dB, without any link loss tilt. In all cases, the signal power launched into the cascade was 0.2 mW per channel. The channel separation was 50 GHz. Depending on the width of the used band- pass filters, the total input signal power was 3 mW or 3.2 mW (15 channels launched for systems A and B, 16 channels launched for system C).

Figure 28:
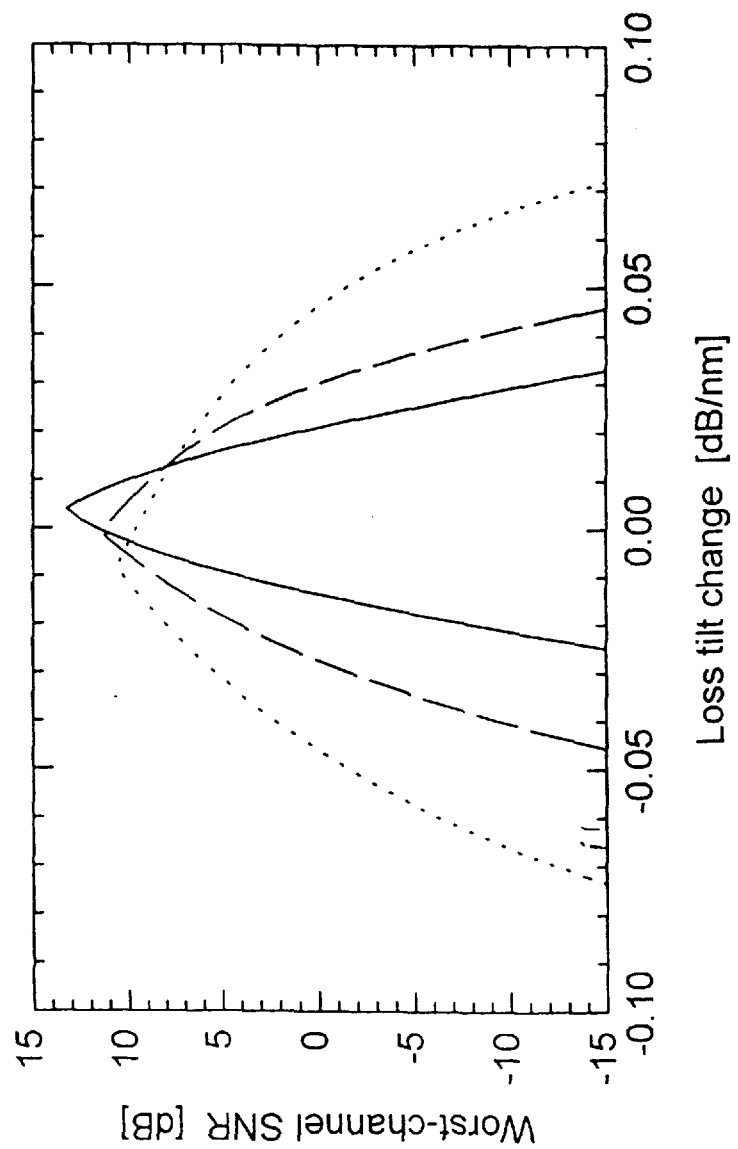
FIG. 28 shows a worst-channel SNR vs loss tilt change, in which results are shown for a system C with (dotted curve) and without (dashed curve) loss tilt bias, and results are shown for a system B without loss tilt bias (solid curve)

FIG. 28 shows simulation results on how the received optical SNR of the noisiest of the 15 or 16 channels depends on the tilt of the link loss for systems B and C. (System A performs similarly to system B.) The wavelength-independent part of the link loss is 10 dB. For system B, FIG. 28 shows that the degradation of the worst-channel SNR that is induced by a loss tilt change is smaller than 10 dB over a range of loss tilts of only 0.028 dB/nm. For system C, the range is 0.053 dB/nm, i.e. almost twice as much. Moreover, the results of system C can be further improved by implementing point 2 on page 25, i.e., the loss f prior to and inside an OA should be large where $g_{p \to p}$ is small, in a form that is suitable for ALTC. We will call this "loss-tilt bias". Specifically, FIG. 28 shows that the range of loss tilts for which the worst-channel degradation is less than 10 dB as large as 0.88 dB/nm can be obtained with loss-tilt bias. This represents a three-fold improvement over system B.

Figure 29:
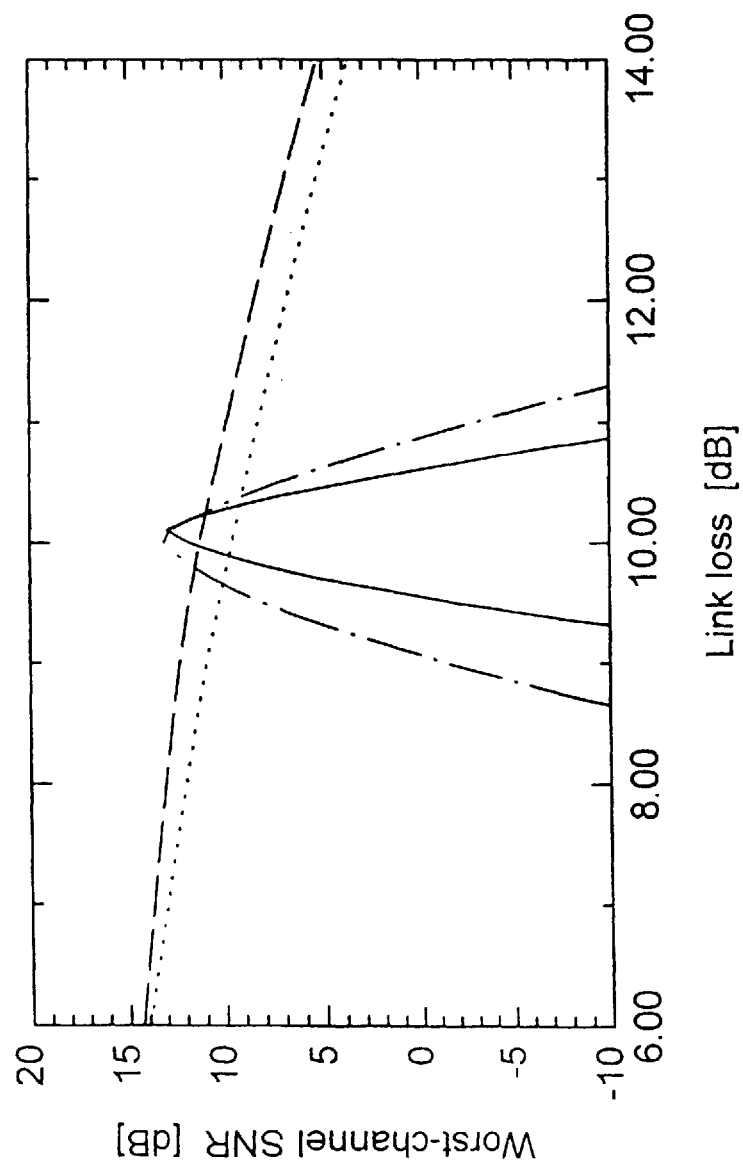
FIG. 29 shows a worst-channel SNR vs link loss, in which results are shown for system C with (dotted curve) and without (dashed curve) loss tilt bias, and results are shown for system B (solid curve) and a system A (chain-dashed curve), both without loss tilt bias.

FIG. 29 shows the dependence of the worst-channel SNR on wavelength-independent link loss changes. A qualitative differences between system C and systems A and B is clearly evident: while the worst-channel SNR of the former system decays slowly with increased link loss, there is a rapid decrease of the SNR for systems A and B, as the link loss moves away from the design value of 10 dB. This "proves" the above "assertion" that the gain should be redistributed to the other optical amplifier for which the gain swing is relatively small at the lasing wavelength.

The conclusions are:
(1) A prior-art cascade (system A) is very sensitive to both wavelength-independent changes of the link loss and to changes of the loss tilt.
(2) A cascade of alternating EDFAs is not sufficient for achieving ALTC (cf. system B); additional measures as described herein are also required (system C without or especially with loss tilt bias).

Since OLAs provide interesting possibilities and advantages, some examples will now be described with reference to FIGS. 27 to 31. An advantage of OLAs is that they can make the gain redistribution between gain media more favorable than it otherwise would be.

Figure 30:
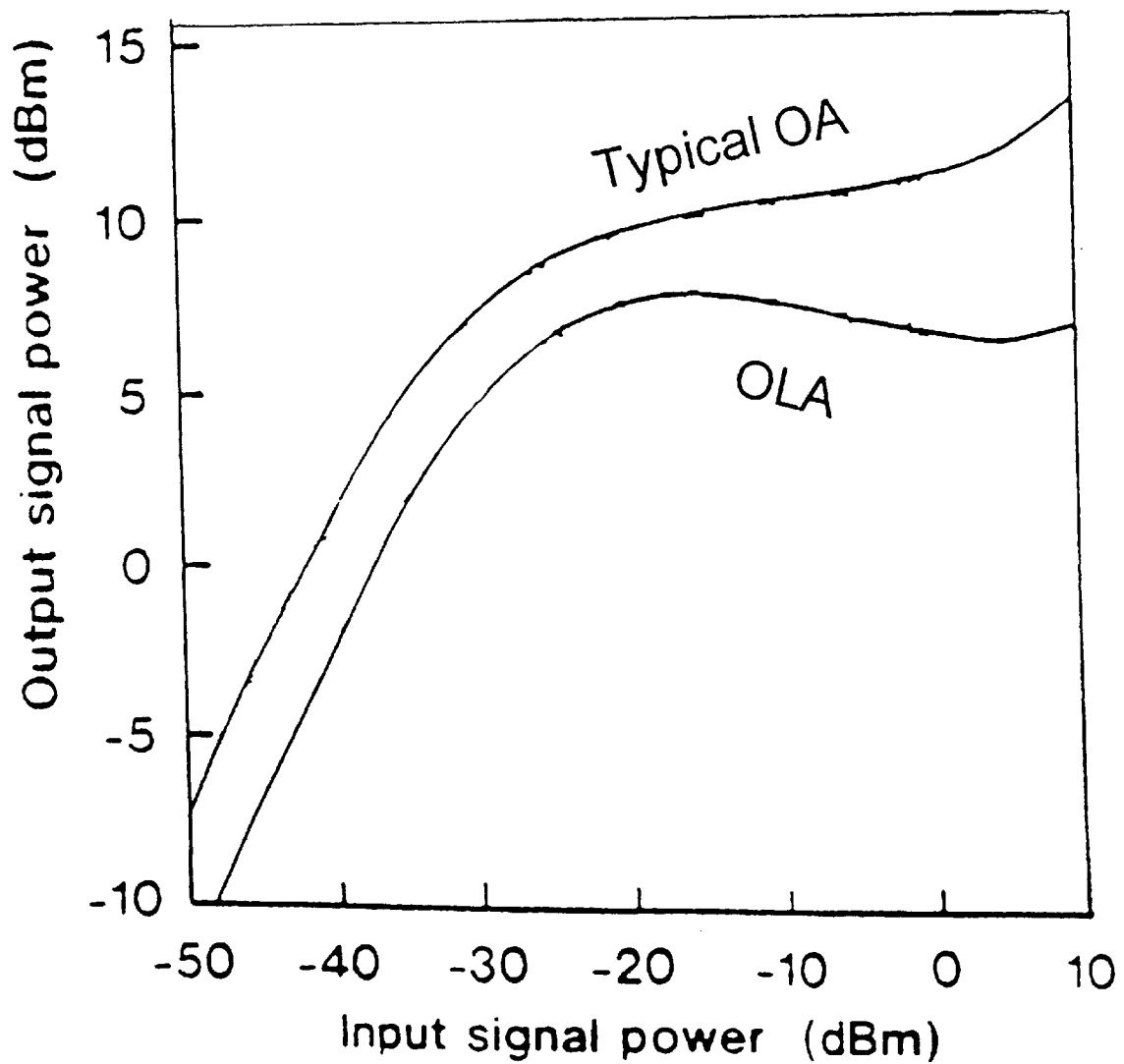
FIG. 30 shows output versus input power characteristics for a typical OA and an optical limiting amplifier (OLA)

FIG. 30 shows output vs. input power characteristics for a typical OA and an optical limiting amplifier (OLA). For the OLA, the output power can decrease with increasing input power in a certain range. For the typical OA, the output power always increases with increasing input power.

Figure 31:
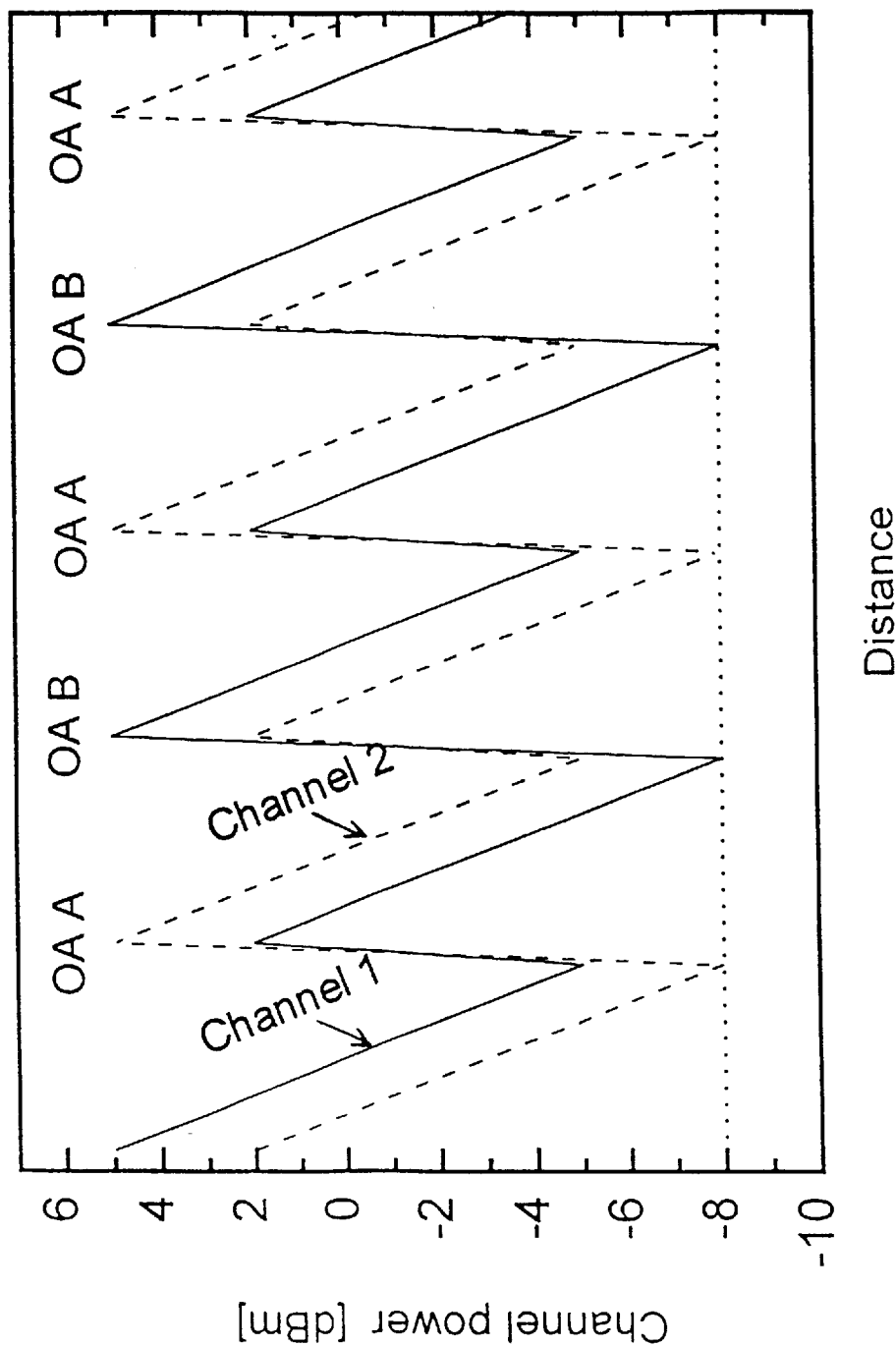
FIG. 31 shows dual-wavelength transmission in a cascade of alternating OAs of a typical, non-OLA, type, in normal operation.

FIG. 31 shows dual-wavelength transmission in a cascade of alternating OAs of a typical, is non-OLA, type. The figure depicts normal operation. For channel 1 (solid line), the gain is much larger in OA B than in OA A (and vice versa for channel 2). However, for both channels, the minimum power is smaller than half of the minimum total power. This "unnecessarily" low minimum channel power degrades the signal-to-noise ratio compared to the ideal situation (depicted in FIG. 33).

Figure 32:
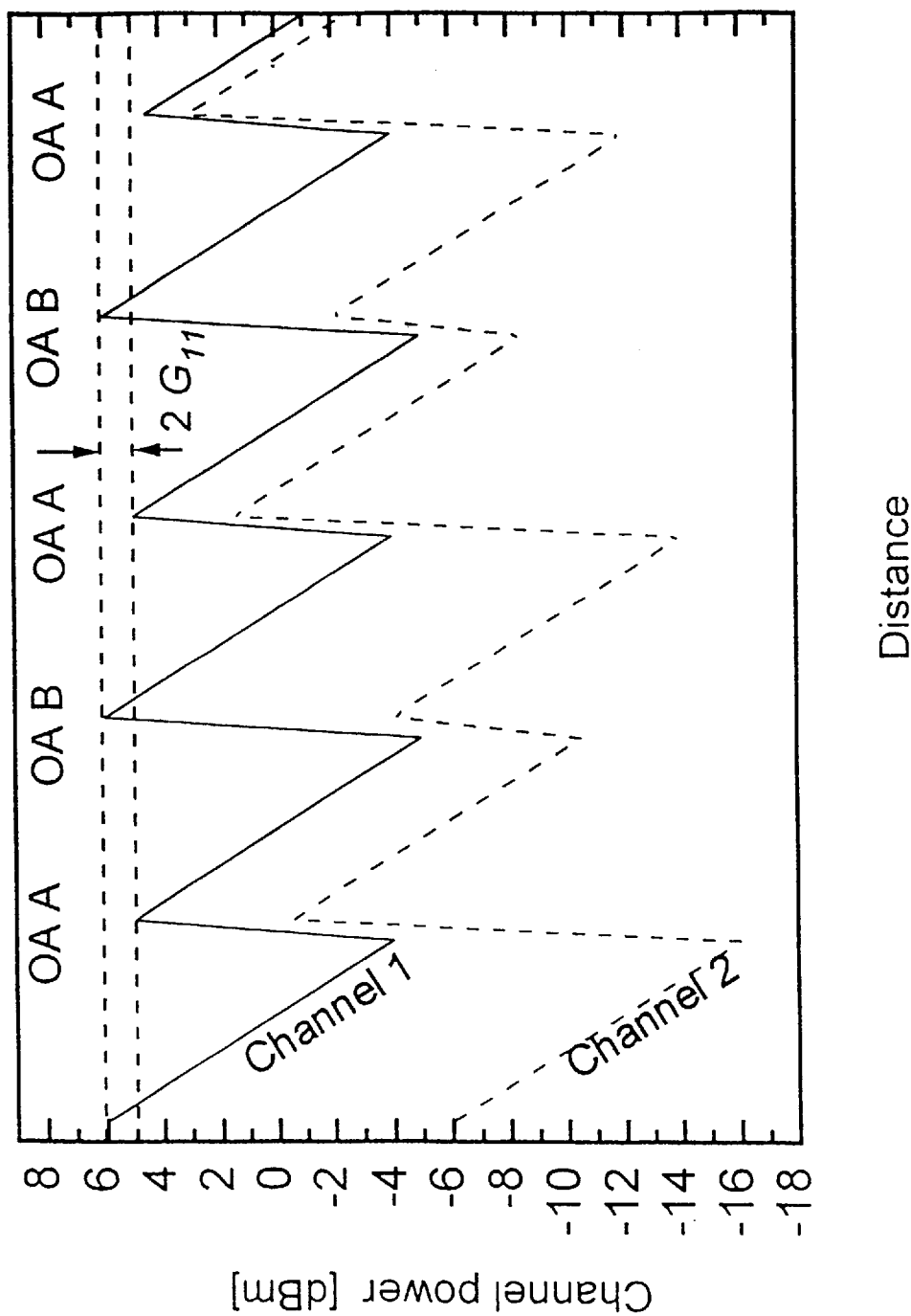
FIG. 32 shows dual-wavelength transmission in a cascade of alternating OAs of a typical, non-OLA, type, in perturbed operation.
Figure 33:
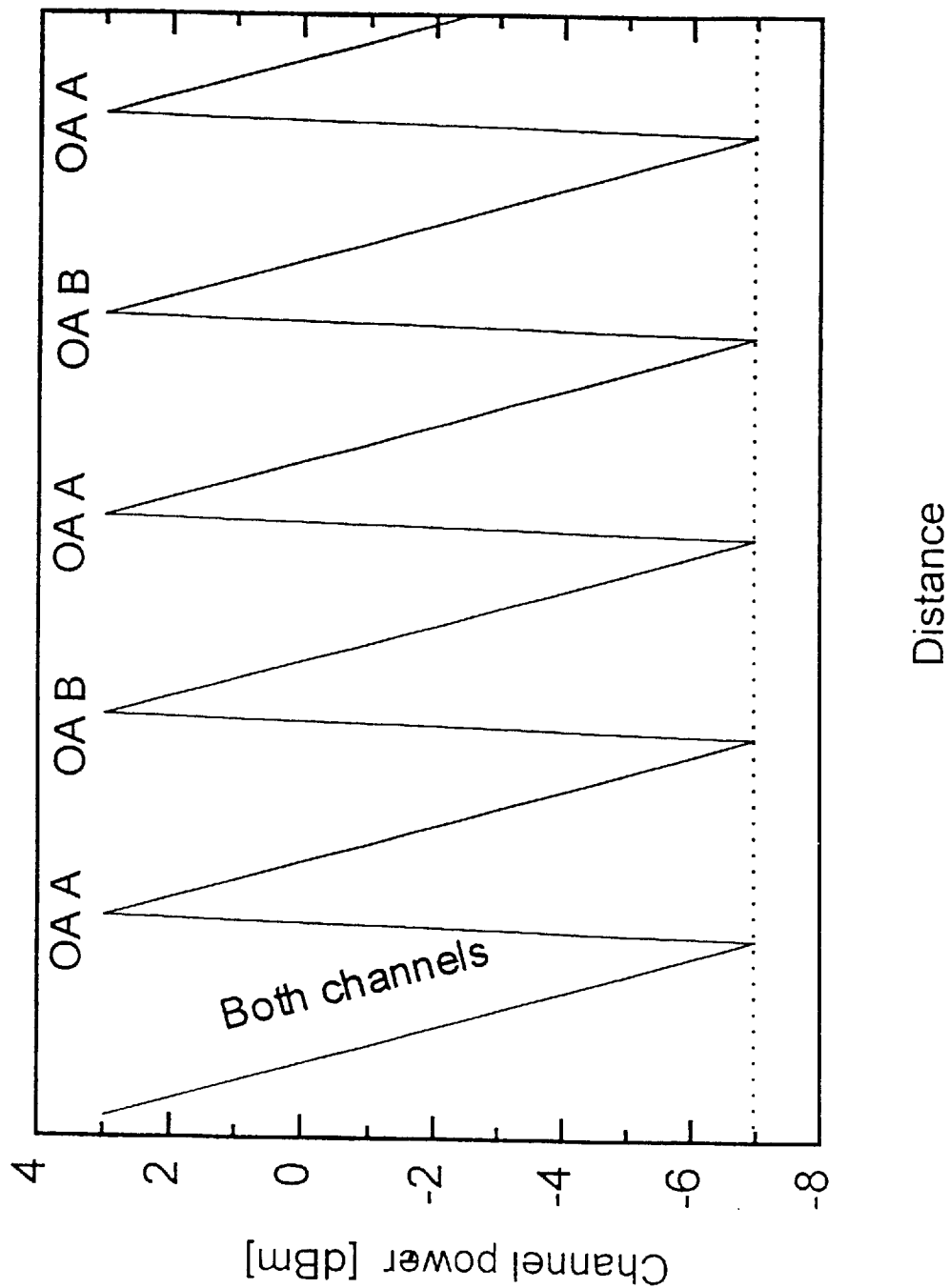
FIG. 33 shows dual-wavelength transmission in a cascade of alternating OLAs, in normal is operation.
Figure 34:
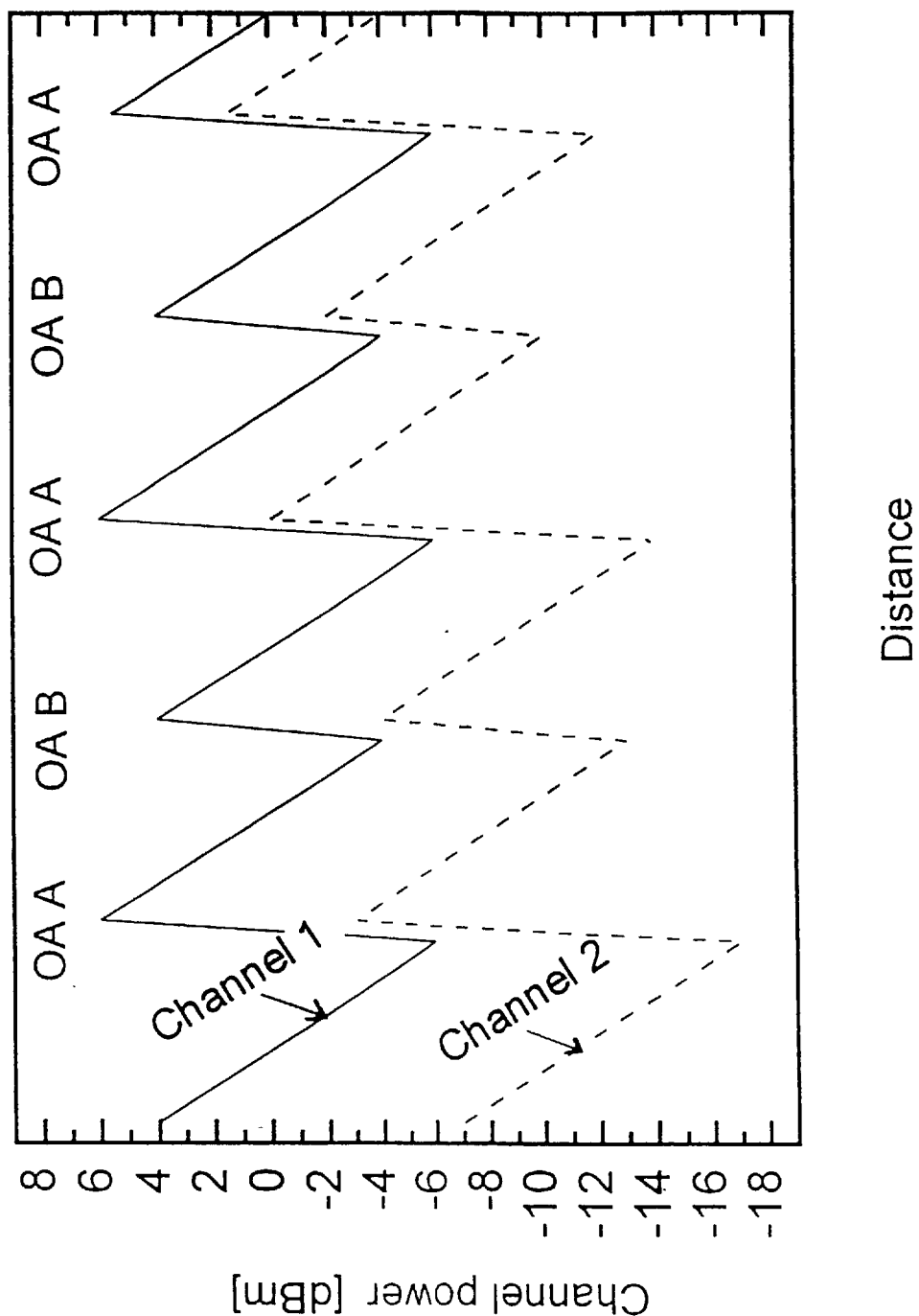
FIG. 34 shows dual-wavelength transmission in a cascade of alternating OLAs, in perturbed operation.

FIG. 32 shows dual-wavelength transmission in a cascade of alternating OAs of a typical, non-OLA, type. The figure depicts perturbed operation, when the channel in one channel (#2) for some reason has become weak. Now, because of the similar output powers of OA A and OAB, the gain of channel 1 is approximately equal in the two different types of OAs. Hence, gain has been redistributed from OA B to OA A, without affecting the total gain at channel 1 (its power is constant over the two-OA period of the cascade). Say that this redistribution is 2 dB. Also the power of channel 2 is roughly sketched. With the proper characteristics of the gain swing at the two wavelengths in the two OAs, the gain redistribution leads to a, say, 2.5 dB increase of the gain of channel 2 in OA B, but only to a, say, 1.8 dB decrease of the gain of channel 2 in OA A. Hence, the power in channel 2 increases, as indicated in the figure FIG. 33 shows dual-wavelength transmission in a cascade of alternating OLAs. The figure depicts normal operation, under which the gain is equal in both OAs and at both channels. The total power can therefore always be evenly shared between the channels, which is the best situation from a signal-to-noise ratio point-of-view. FIG. 34 shows dual-wavelength transmission in a cascade of alternating OLAs. The figure depicts perturbed operation, when the channel in one channel (#2) for some reason has become weak. The OLA characteristics (FIG. 37) leads to a redistribution of gain at the power-dominant channel 1 from OA B to OA A, which, as for FIG. 32, results in a net average gain in the power-deficient channel 2. From an SNR point-of-view, the advantage of the OLAs is then that the SNR is "maximized" under normal operation. A slight disadvantage is that the cascade becomes noisier than necessary under atypical conditions as in this figure. This is a result of the lower output power of OA B when the input power of channel 1 becomes higher. (Here, we also assume that OA B predominantly limits channel 1, and OA A predominantly limits channel 2. Such a channel- (actually, wavelength-) dependent limiting is easily realized in practice.

It is to be appreciated that, generally, designs and procedures adopted or proposed herein for discrete wavelength transmission can be adapted to transmission over a full range of frequencies in a particular wavelength range. Also, generally, designs and procedures adopted or proposed herein for multi-wavelength transmission may readily be adapted to multi-wavelength lasers.

The reader's attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An optical amplifier system comprising a plurality of gain media connected in series and arranged to amplify an optical signal having a plurality of wavelengths wherein at least two of said gain media work in saturation and different ones of said gain media are spectrally different such that they interact primarily with different ones of the wavelengths, so that in the event of a perturbation of power of a single channel from an equilibrium distribution, the saturation of the different gain media changes primarily in that gain medium with which the channel interacts more strongly, thus modifying the gain spectrum of the amplifier system in a way that acts to return the channel powers to said equilibrium distribution.

2. An optical amplifier system comprising:
    a plurality of optical amplifiers connected in series, each of said plurality of optical amplifiers comprising:
    a first broad bandpass filter for receiving an optical signal comprised of a plurality of optical wavelengths, an aluminosilicate erbium doped fiber amplifier operating in saturation and a first transmission fiber disposed between said first broad bandpass filter and said aluminosilicate erbium doped fiber amplifier; and
    a second broad bandpass filter for receiving an optical signal comprised of a plurality of optical wavelengths, a germanosilicate erbium doped fiber amplifier not operating in saturation and a second transmission fiber disposed between said second broad bandpass filter and said germanosilicate erbium doped fiber amplifier.

3. The optical amplifier system as set forth in claim 2 further comprising:
    a first gain flattening filter disposed between said first transmission fiber and said first broad bandpass filter; and
    a second gain flattening filter disposed between said second transmission fiber and said second broad bandpass filter.

4. The optical amplifier system as set forth in claim 2 further comprising a gain flattening filter disposed between said second transmission fiber and said second broad bandpass filter, wherein no gain flattening filter is disposed between said first transmission fiber and said first broad bandpass filter.

5. The optical amplifier system as set forth in claim 2, wherein alternate ones of said a plurality of optical amplifiers connected in series are comprised of an optical limiting amplifier.

6. The optical amplifier system as set forth in claim 2, wherein said aluminosilicate erbium doped fiber amplifier interacts primarily in a first optical wavelength and said germanosilicate erbium doped fiber amplifier interacts primarily in a second optical wavelength.

7. The optical amplifier system as set forth in claim 2, wherein said first and second broad bandpass filters have a wavelength range of 1553~1559 nanometers.

8. An optical amplifier system comprising:
    a plurality of cascaded first and second optical amplifiers, wherein each said first optical amplifier comprises:
        a first broad bandpass filter for receiving an optical signal comprised of a plurality of optical wavelengths, an aluminosilicate erbium doped fiber amplifier operating in saturation and a first transmission fiber disposed between said first broad bandpass filter and said aluminosilicate erbium doped fiber amplifier; and
    each said second optical amplifier comprises:
        a second broad bandpass filter for receiving an optical signal comprised of a plurality of optical wavelengths, a germanosilicate erbium doped fiber amplifier not operating in saturation and a second transmission fiber disposed between said second broad bandpass filter and said germanosilicate erbium doped fiber amplifier.

9. The optical amplifier system as set forth in claim 8, further comprising:
    a first gain flattening filter disposed between said first transmission fiber and said first broad bandpass filter; and
    a second gain flattening filter disposed between said second transmission fiber and said second broad bandpass filter.

10. The optical amplifier system as set forth in claim 8, further comprising a gain flattening filter disposed between said second transmission fiber and said second broad bandpass filter, wherein no gain flattening filter is disposed between said first transmission fiber and said first broad bandpass filter.

11. The optical amplifier system as set forth in claim 8, wherein each said second optical amplifier comprises an optical limiting amplifier.

12. The optical amplifier system as set forth in claim 8, wherein said aluminosilicate erbium doped fiber amplifier interacts primarily in a first optical wavelength and said germanosilicate erbium doped fiber amplifier interacts primarily in a second optical wavelength.

13. The optical amplifier system as set forth in claim 8, wherein said first and second broad bandpass filters have a wavelength range of 1553~1559 nanometers.

14. The optical amplifier system as set forth in claim 8, wherein each of said first and second transmission fibers are comprised of a single mode fiber.

15. The optical amplifier system as set forth in claim 8, wherein said aluminosilicate erbium doped fiber amplifier and said germanosilicate erbium doped fiber amplifier are spectrally different.

16. The optical amplifier system as set forth in claim 15, wherein said aluminosilicate erbium doped fiber amplifier interacts primarily in a first optical wavelength and said germanosilicate erbium doped fiber amplifier interacts primarily in a second optical wavelength.

* * * * *